(12) United States Patent
Taoka

(10) Patent No.: US 7,367,587 B2
(45) Date of Patent: May 6, 2008

(54) INSTRUMENT PANEL STRUCTURE FOR VEHICLES

(75) Inventor: Yoshifumi Taoka, Kawanishi (JP)

(73) Assignee: Daihatsu Motor Co., Ltd., Osaka (JP)

( * ) Notice: Subject to any disclaimer, the term of this patent is extended or adjusted under 35 U.S.C. 154(b) by 360 days.

(21) Appl. No.: 10/513,775

(22) PCT Filed: May 9, 2003

(86) PCT No.: PCT/JP03/05856

§ 371 (c)(1),
(2), (4) Date: Jun. 6, 2005

(87) PCT Pub. No.: WO03/095272

PCT Pub. Date: Nov. 20, 2003

(65) Prior Publication Data

US 2005/0253369 A1    Nov. 17, 2005

(30) Foreign Application Priority Data

May 10, 2002 (JP) ............................. 2002-135417
Aug. 28, 2002 (JP) ............................. 2002-249031

(51) Int. Cl.
*B60R 21/04* (2006.01)

(52) U.S. Cl. ................. 280/751; 280/728.2; 280/728.3; 280/752

(58) Field of Classification Search ............. 280/728.2, 280/728.3, 732, 743.2, 750, 751, 752
See application file for complete search history.

(56) References Cited

U.S. PATENT DOCUMENTS

| | | | |
|---|---|---|---|
| 5,503,427 A | 4/1996 | Ravenberg et al. | |
| 5,547,614 A | 8/1996 | Fesman et al. | |
| 6,136,997 A | 10/2000 | Bright et al. | |
| 6,193,272 B1 | 2/2001 | Aigner et al. | |
| 6,299,198 B1 * | 10/2001 | Nakashima et al. | 280/728.3 |
| 6,338,501 B1 | 1/2002 | Heilig et al. | |
| 6,416,079 B1 | 7/2002 | Lutz et al. | |
| 6,578,867 B2 * | 6/2003 | Khoudari et al. | 280/730.1 |
| 6,601,870 B2 * | 8/2003 | Suzuki et al. | 280/728.3 |
| 6,692,017 B2 * | 2/2004 | Taoka et al. | 280/728.2 |

(Continued)

FOREIGN PATENT DOCUMENTS

EP    0406934    1/1991

(Continued)

*Primary Examiner*—Toan To
(74) *Attorney, Agent, or Firm*—The Webb Law Firm

(57) ABSTRACT

An instrument panel construction for a vehicle capable of receiving and stopping the driver's/passenger's knee regions when a great impact acts on a vehicle to control the impact exerted on the driver's/passenger's knee regions while restraining the driver's/passenger's waist from moving forward along a seating portion of a seat.

The construction includes an instrument panel (2) made of synthetic resin, a receiving portion (7) provided in a lower portion of the instrument panel (2) to be separable from the instrument panel, and a moving device (13, 14) for separating the receiving portion (7) from the instrument panel (2) to move the receiving portion rapidly toward a seat (1) positioned rearward when a great impact acts on the vehicle. An absorbing member (8) made of plastically deformable metal or reinforced synthetic resin is attached to the back surface of the receiving portion (7).

8 Claims, 21 Drawing Sheets

U.S. PATENT DOCUMENTS

| | | |
|---|---|---|
| 6,715,789 B2 * | 4/2004 | Takimoto et al. ........ 280/730.1 |
| 6,726,339 B2 * | 4/2004 | Rhoads ........................ 359/857 |
| 6,761,375 B2 * | 7/2004 | Kurachi et al. ............. 280/732 |
| 6,860,505 B2 * | 3/2005 | Yasuda et al. ........... 280/728.3 |
| 6,929,280 B2 * | 8/2005 | Yasuda et al. ........... 280/728.2 |
| 7,007,970 B2 * | 3/2006 | Yasuda et al. ........... 280/728.3 |
| 7,029,026 B2 * | 4/2006 | Morita .................... 280/728.3 |
| 7,178,825 B2 * | 2/2007 | Fujii et al. ................ 280/728.3 |
| 2002/0049268 A1 | 4/2002 | White et al. |

FOREIGN PATENT DOCUMENTS

| | | |
|---|---|---|
| EP | 0612837 | 8/1994 |
| JP | 52-137444 | 10/1977 |
| JP | 56-087954 | 7/1981 |
| JP | 01-063559 | 4/1989 |
| JP | 04-106060 | 9/1992 |
| JP | 9-086318 | 3/1997 |
| JP | 9-240407 | 9/1997 |
| JP | 10-230812 | 9/1998 |
| JP | 11-139233 | 5/1999 |
| JP | 2000-225911 | 8/2000 |
| JP | 2000-326810 | 11/2000 |
| WO | 96/11996 | 4/1996 |
| WO | WO 00/05105 | 2/2000 |

* cited by examiner

FIG.1
(a)
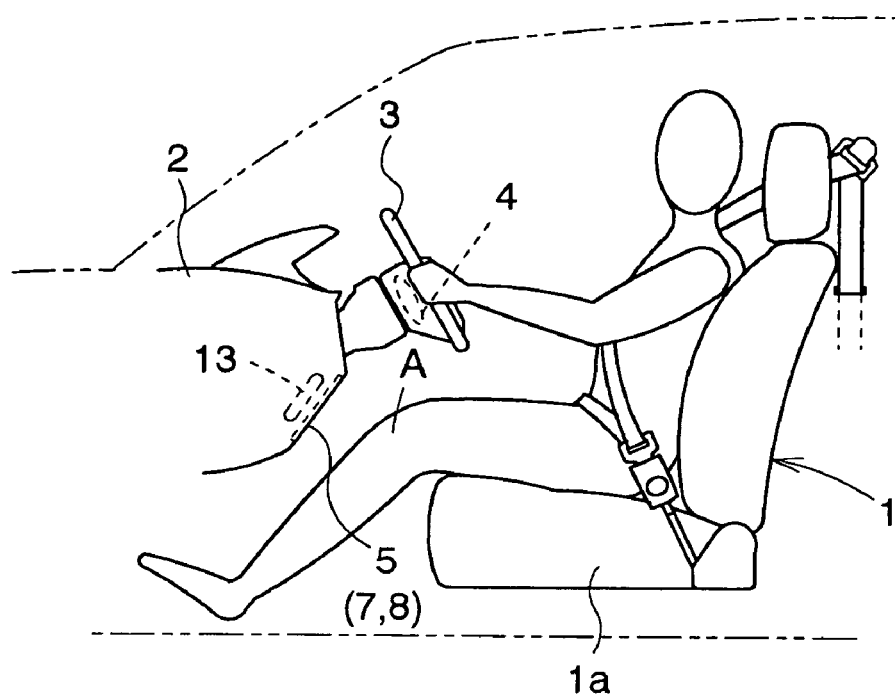
(b)
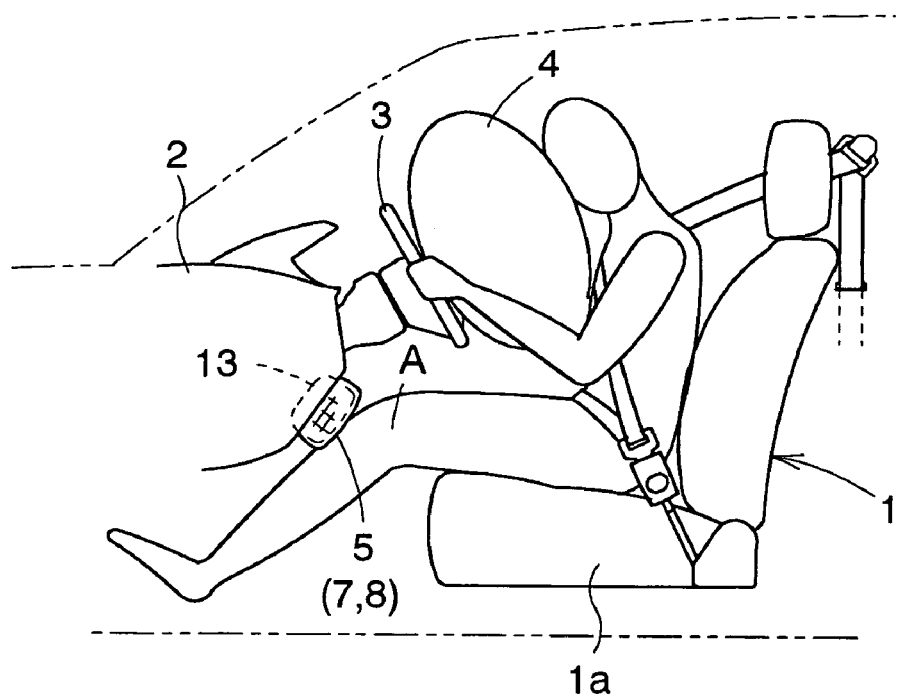

(a)   (b)

INSTRUMENT PANEL STRUCTURE FOR VEHICLES

TECHNICAL FIELD

The present invention relates to an instrument panel construction for a vehicle positioned forwardly of a seat in a vehicle such as a passenger vehicle, a commercial vehicle, a bus or the like and capable of receiving the driver's/passenger's knee regions when a great impact acts on the vehicle to prevent the driver's/passenger's waist from moving forward along a seating portion of the seat as well as reducing the impact acting on the driver's/passenger's knee regions.

BACKGROUND ART

When a vehicle collision occurs with the driver/passenger seated, the driver's/passenger's waist moves forward along the seating portion of the seat under a forward inertia and the driver's/passenger's upper body tends to fall forward about his or her waist acting as fulcrum.

When an air bag arranged forwardly of the driver/passenger receives and stops the driver's/passenger's upper body in such a condition, the driver's/passenger's upper body is positioned closer to the air bag by an amount corresponding to the forward movement of the driver's/passenger's waist along the seating portion of the seat. Thus, the driver's/passenger's upper body would reach the air bag sooner as it starts falling forward. In other words, the stroke of forward fall of the driver's/passenger's upper body is reduced by the amount of forward movement of the driver's/passenger's waist along the seating portion of the seat, to absorb the shock within the reduced stroke of forward fall of the driver's/passenger's upper body. This is undesirable in terms of shock absorption for the driver/passenger by the air bag.

Hence, it is required that the air bag should receive the driver's/passenger's upper body without reducing the stroke of forward fall of the driver's/passenger's upper body by restraining the driver's/passenger's waist from moving forward along the seating portion of the seat.

In this case, an example is shown in Japanese Patent Application "Kokai" No. 11-139233 in which a lower air bag is arranged inside a lower portion of an instrument panel. By inflating the lower air bag, part of the instrument panel is separated and moved toward the seat positioned rearward. As a result, the separated part of the instrument panel receives and stops the driver's/passenger's knee regions to restrain the driver's/passenger's waist from moving forward along the seating portion of the seat.

Where the part of the instrument panel is separated and moved toward the seat positioned rearward as disclosed in the above-noted conventional art, in addition to the aspect of restraining the driver's/passenger's waist from moving forward along the seating portion of the seat, it is an important consideration to control the impact acting on the driver's/passenger's knee regions when the part of the instrument panel receives and stops the driver's/passenger's knee regions.

In this case, it is expected that the part of the instrument panel should be deformed when receiving and stopping the driver's/passenger's knee regions thereby to absorb the impact exerted on the driver's/passenger's knee regions.

However, since the instrument panel of the prior art is made of synthetic resin, part of the instrument panel is sometimes bent linearly (see FIG. 6 of Japanese Patent Application "Kokai" No. 11-139233 as noted above) when it receives the driver's/passenger's knee regions. This leaves room for improvement in terms of controlling the impact exerted on the driver's/passenger's knee regions.

Therefore, the object of the present invention is to provide an instrument panel construction for a vehicle capable of receiving the driver's/passenger's knee regions when a great impact acts on the vehicle and restraining the driver's/passenger's waist from moving forward along the seating portion of the seat while controlling the impact exerted on the driver's/passenger's knee regions.

DISCLOSURE OF THE INVENTION

The first characteristic feature of an instrument panel construction for a vehicle according to the present invention is in that the construction includes a receiving portion provided in a lower portion of an instrument panel made of synthetic resin to be separable from the instrument panel, and a moving device for separating the receiving portion from the instrument panel and moving the receiving portion rapidly toward a seat positioned rearward when a great impact acts on the vehicle, with an absorbing member made of plastically deformable metal or reinforced synthetic resin being attached to a back surface of the receiving portion.

With this characteristic construction, the following functions and effects are performed.

When a great impact acts on the vehicle and the driver's/passenger's waist is about to move forward along the seating portion of the seat, the receiving portion is separated from the instrument panel by the moving device to rapidly move toward the seat positioned rearward and receive the driver's/passenger's knee regions, which prevents the driver's/passenger's waist from moving forward along the seating portion of the seat. Thus, a large stroke of forward fall of the driver's/passenger's upper body can be secured, which allows the air bag to receive and stop the driver's/passenger's upper body effectively.

Also, since the absorbing member made of plastically deformable metal or reinforced synthetic resin is attached to the back surface of the receiving portion, the absorbing member is plastically deformed together with the receiving portion when the driver's/passenger's knee regions are received and stopped by the receiving portion. As a result, the plastic deformation of the absorbing member primarily causes the receiving portion and the absorbing member to be deformed to a concave shape to fit to the driver's/passenger's knee regions, thereby to absorb the impact acting on the driver's/passenger's knee regions properly.

Further, since the absorbing member is attached directly to the back surface of the receiving portion so that the absorbing member is supported by the receiving portion, there is no need to provide any supporting member in a fixed portion in the interior of the instrument panel to support the absorbing member. Any supporting member, if provided at all, may be a small support member. Thus, it will be advantageous in terms of simplification of the construction.

The second characteristic feature of the instrument panel construction for a vehicle according to the present invention is that, in the first characteristic feature, the absorbing member includes a plurality of face portions arranged at predetermined intervals and bend portions bent to project from the face portions to interconnecting the adjacent face portions, and that the absorbing member is attached to the back surface of the receiving portion so that the face portions contact the back surface of the receiving portion while the bend portions project away from the back surface of the receiving portion.

With such characteristic construction, the following functions and effects are performed in addition to the functions and effects provided by the first characteristic feature.

When the receiving portion receives the driver's/passenger's knee regions and is caused to deform to a concave shape, the adjacent face portions of the absorbing member are moved toward or away from each other to extend or bend the bend portions of the absorbing member, thereby to plastically deform the absorbing member. Therefore, the plurality of bend portions provided on the absorbing member facilitate the plastic deformation of the absorbing member to fit to the driver's/passenger's knee regions, as compared with a simple and single plate-like absorbing member. This may absorb the impact acting on the driver's/passenger's knee regions more properly.

Also, since the absorbing member is made of metal or reinforced synthetic resin, a bending strength of the bend portions of the absorbing member may be determined as desired, which means that a degree of absorption of the impact acting on the driver's/passenger's knee regions may be selected as desired. Thus, the construction may easily be adapted to various kinds of instrument panels and vehicles. The configuration of the bend portions of the absorbing member is determined, for example, according to a radius of bending the bend portions of the absorbing member, a distance set to the predetermined intervals between the adjacent face portions of the absorbing member, a length of the bend portions, i.e., a length of projection from the face portions of the absorbing member, and so on.

Further, the face portions of the absorbing member contact the back surface of the receiving member, thereby to contain the bend portions of the absorbing member in a range of projection of the bend portions moving away from the back surface of the receiving member. This diminishes a space for arrangement of the absorbing member, which is advantageous in minimizing the receiving portion and surrounding regions.

The third characteristic feature of the instrument panel construction for a vehicle according to the present invention is that, in the first characteristic feature, the construction further comprises a preventing device for preventing the receiving portion from moving beyond a predetermined position toward the seat positioned rearward when the receiving portion is separated from the instrument panel by the moving device to move toward the seat positioned rearward.

With such characteristic construction, the following functions and effects are performed in addition to the functions and effects provided by the first characteristic feature.

When the receiving portion is separated from the instrument panel by the moving device to rapidly move toward the seat positioned rearward, it is prevented from moving toward the seat positioned rearward too much. This avoids an increase of the shock given to the driver's/passenger's knee regions when the receiving portion receives and stops the driver's/passenger's knee regions thereby to absorb the shock properly.

The fourth characteristic feature of the instrument panel construction for a vehicle according to the present invention is that, in the third characteristic feature, the absorbing member includes connecting portions provided at outer peripheries thereof and bent and projecting away from the back surface of the receiving portion to be connected to the instrument panel before the receiving portion is separated from the instrument panel, thereby to form the preventing device.

With such characteristic construction, the following functions and effects are performed in addition to the functions and effects provided by the third characteristic feature.

When the receiving portion is separated from the instrument panel by the moving device to rapidly move toward the seat positioned rearward, the bent connecting portions of the absorbing member are extended to allow the receiving portion and the absorbing member to move toward the seat positioned rearward. After this, the connecting portions of the absorbing member are not allowed to extend any further, thereby to prevent the receiving portion and the absorbing member from moving beyond the predetermined position toward the seat positioned rearward. Thus, the construction of the connecting portions extending from part of the outer peripheries of the absorbing member can dispense with any member separated from the absorbing member which may be connected between the absorbing member and the instrument panel. This is advantageous in simplifying the construction.

The fifth characteristic feature of the instrument panel construction for a vehicle according to the present invention is that, in any one of the first to fourth characteristic features, the receiving portion is separable into a plurality of small segments.

With such characteristic construction, the following functions and effects are performed in addition to the functions and effects provided by any one of the first to fourth characteristic features.

When the receiving portion is separated from the instrument panel to rapidly move toward the seat positioned rearward, the receiving portion in the form of the plurality of small segments has a less possibility of restricting the plastic deformation of the absorbing member. As a result, the receiving portion and the absorbing member well fit to the driver's/passenger's knee regions to absorb properly the shock applied to the driver's/passenger's knee regions.

The sixth characteristic feature of the instrument panel construction for a vehicle according to the present invention is that, in the first characteristic feature, the construction further comprises an air bag and an inflator for rapidly inflating the air bag provided on the back surface of the receiving portion, the air bag and inflator constituting the moving device.

With such characteristic construction, the following functions and effects are performed in addition to the functions and effects provided by the first characteristic feature.

The air bag is inflated by the inflator to push the receiving portion and absorbing member whereby the receiving portion is separated from the instrument panel to rapidly move toward the seat positioned rearward. In this state, the entire receiving portion and absorbing member are substantially uniformly pushed and supported by the inflated air bag. Thus, when the driver's/passenger's knee regions are received and stopped by the receiving portion, the receiving portion and the absorbing member easily and evenly deform to a concave shape. This reduces the possibility of causing a situation, for example, where parts of the receiving portion and the absorbing member are hard to deform to the concave shape or parts thereof are easy to deform to the concave shape. As a result, the impact acting on the driver's/passenger's knee regions is properly absorbed.

The seventh characteristic feature of the instrument panel construction for a vehicle according to the present invention is that, in the sixth characteristic feature, when the receiving portion is separated from the instrument panel by inflation of the air bag to move toward the seat positioned rearward, the air bag is developed outwardly from between the instrument panel and the receiving portion.

With such characteristic construction, the following functions and effects are performed in addition to the functions and effects provided by the sixth characteristic feature.

When the receiving portion separable from the instrument panel is provided in a lower portion of the instrument panel made of synthetic resin, the area of the receiving portion is limited. Therefore, if the receiving portion is provided in a region of the instrument panel adjacent the seat, for example, the receiving portion is incapable of securing a large area due to the presence of a proximal portion of the steering wheel. The air bag may have a larger size to develop outwardly from between the instrument panel and the receiving portion. Then, when the receiving portion is capable of receiving only one of the driver's/passenger's knee regions, the outwardly developed air bag may receive the other of the driver's/passenger's knee regions. For example, it is possible to develop the air bag toward the driver's/passenger's body parts other than the knee regions to receive the other body parts. As a result, the impact acting on the driver's/passenger's knee regions and the parts other than the driver's/passenger's knee regions may be properly absorbed.

The eighth characteristic feature of the instrument panel construction for a vehicle according to the present invention is that, in the sixth characteristic feature, the air bag is made of blow-molded synthetic resin.

With such characteristic construction, in addition to the functions and effects provided by the sixth characteristic feature, the manufacturing cost is advantageously reduced compared with the construction of the air bag made of cloths sewn together.

The ninth characteristic feature of the instrument panel construction for a vehicle according to the present invention is that, in any one of the sixth to eighth characteristic features, a pad member is provided between the absorbing member and the air bag.

With such characteristic construction, the following functions and effects are performed in addition to the functions and effects provided by any one of the sixth to eighth characteristic features.

When the air bag is inflated by the inflator to push the receiving portion and the absorbing member, thereby to cause the receiving portion to separate from the instrument panel and rapidly move toward the seat positioned rearward, the pad member may have a proper hardness relative to the air bag to allow the receiving portion and the absorbing member to move toward the seat positioned rearward, with their generally planar shape maintained, or without being deformed to a convex shape by inflation of the air bag. As a result, the driver's/passenger's knee regions may be appropriately received by the receiving portion and the absorbing member, thereby to prevent properly the driver's/passenger's waist from moving forward along the seating portion of the seat.

Further, when the impact acting on the driver's/passenger's knee regions is not sufficiently absorbed only by deformation of the receiving portion and the absorbing member to the concave shape, the pad member may also absorb the impact acting on the driver's/passenger's knee regions. As a result, the construction may absorb the shock more properly.

BRIEF DESCRIPTION OF THE DRAWINGS

FIG. 1 is side views of a region around a seat and an instrument panel according to a first embodiment of the present invention;

BEST MODE FOR CARRYING OUT THE INVENTION

Figure 2:
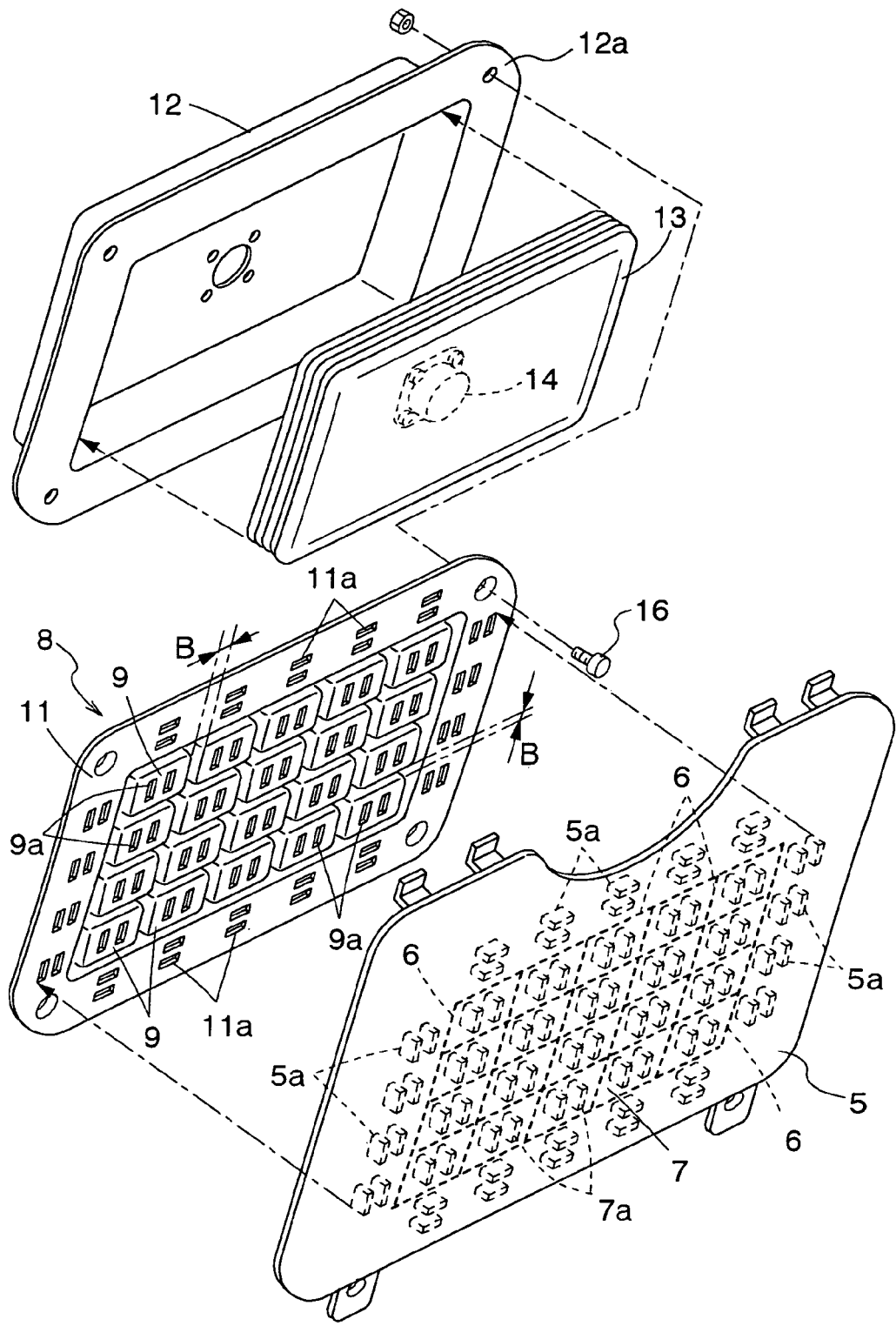
FIG. 2 is an exploded perspective view of a lower panel portion, a receiving portion, an absorbing member, a lower air bag, an inflator and the like in the first embodiment of the present invention.

Embodiments of the present invention will be described hereinafter with reference to the accompanying drawings.

First Embodiment of the Invention

In this embodiment, as illustrated in FIG. 1(a), an instrument panel 2 and a steering wheel 3 are arranged forwardly of a driver's seat 1, and an air bag 4 is mounted inside the steering wheel 3. The instrument panel 2 made of synthetic resin has a lower panel portion 5 made of synthetic resin and disposed below the steering wheel 3.

Figure 3:
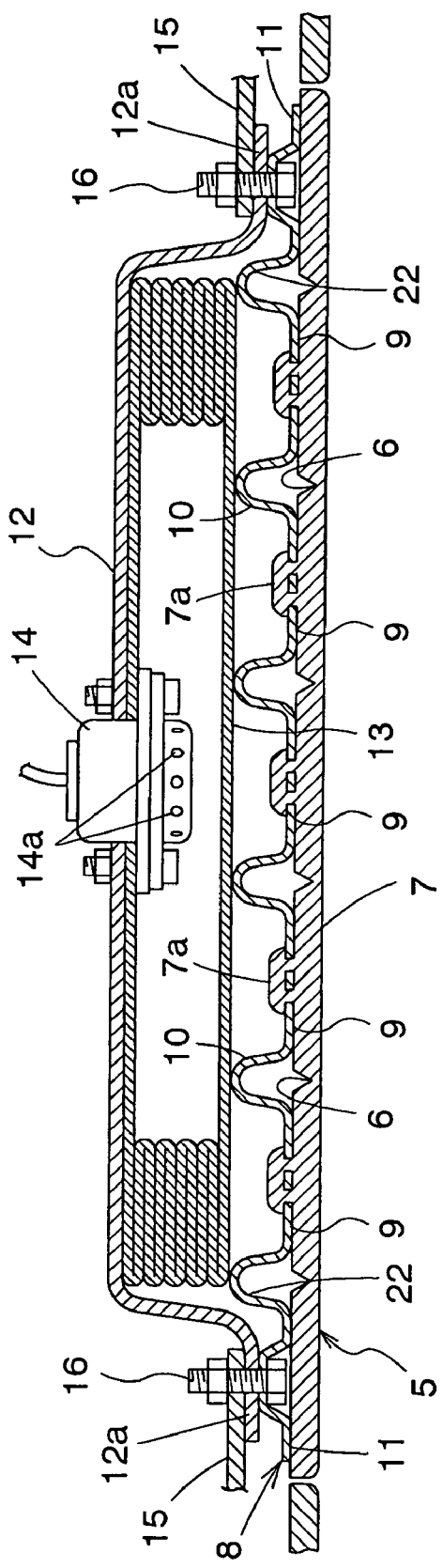
FIG. 3 is a cross sectional plan view of a region around the lower panel portion, receiving portion, absorbing member, lower air bag and inflator according to the first embodiment of the present invention.

As shown in FIGS. 2 and 3, a plurality of grooves 6 are formed on the back surface of the lower panel portion 5 which run longitudinally and transversely in a grid shape. A rectangular receiving portion 7 surrounded by the outermost grooves 6 is defined on the lower panel portion 5. Numerous projections 5a and 7a are integrally formed on the back surface of the lower panel portion 5 at outer peripheries thereof and the back surface of the receiving portion 7, respectively.

As illustrated in FIGS. 2 and 3, an absorbing member 8 is formed by press-working a plate material made of metal or reinforced synthetic resin (multiple reinforced type or fiberglass reinforced type synthetic resin). The absorbing member 8 includes face portions 9 which are rectangular in front view and arranged longitudinally and transversely at predetermined intervals B, and bend portions 10 bent to project in an opposite direction from surfaces of the face portions 9 and connected to adjacent face portions 9. Connecting portions 22 are formed integrally with outer peripheries of the absorbing member 8 (face portions 9). Similarly to the bend portions 10, the connecting portions 22 bend and project in the opposite direction from the surfaces of the face portions 9. A flange portion 11 is formed integrally with the connecting portions 22. Small rectangular openings 9a and 11a are formed in the face portions 9 and the flange portion 11, respectively.

With the above-noted construction, as shown in FIGS. 2 and 3, the projections 5a of the lower panel portion 5 are inserted into the openings 11a of the flange portion 11 of the absorbing member 8 while the projections 7a of the receiving portion 7 are inserted into the openings 9a of the face portions 9 of the absorbing member 8, which places the face portions 9 and the flange portion 11 of the absorbing member 8 in contact with the back surface of the lower panel portion 5 and receiving portion 7. The projections 5a of the lower panel portion 5 and the projections 7a of the receiving portion 7 are heated and compressed thereby to attach the absorbing member 8 to the back surface of the lower panel portion 5 and the receiving portion 7. In this condition, the bend portions 10 and the connecting portions 22 of the absorbing member 8 are arranged in positions opposed to the grooves 6 of the lower panel portion 5 and project away from the back surface of the lower panel portion 5 and the receiving portion 7.

As shown in FIGS. 2 and 3, a supporting member 12 is provided which comprises a metal plate material bent to a box-like shape. A lower air bag 13 is mounted in the supporting member 12, and an inflator 14 is provided inside the lower air bag 13. The lower air bag 13 is made of blow-molded synthetic resin and folded to be mounted in the supporting member 12. The inflator 14 has numerous injection openings 14a at outer peripheries thereof, and unillustrated igniter and enhancer provided inside thereof, and is charged with a gas generating agent. The supporting member 12 has a flange portion 12a formed at outer peripheries thereof. The flange portion 12a of the supporting member 12 and the flange portion 11 of the absorbing member 8 are connected to brackets 15 arranged inside the instrument panel 2, through bolts 16.

With this construction, when a collision sensor (not shown) provided on a vehicle body detects a collision, the enhancer is ignited by the igniter in the inflator 14. The gas generating agent is combusted by combustion of the enhancer, whereby a gas generated from the gas generating agent is injected radially toward outer peripheries from the injection openings 14a. The gas flows from peripheries of the lower air bag 13 to the center of the lower air bag 13, thereby to inflate the lower air bag 13 to push the absorbing member 8 toward the seat 1 positioned rearward (rightward in FIG. 2).

Figure 4:
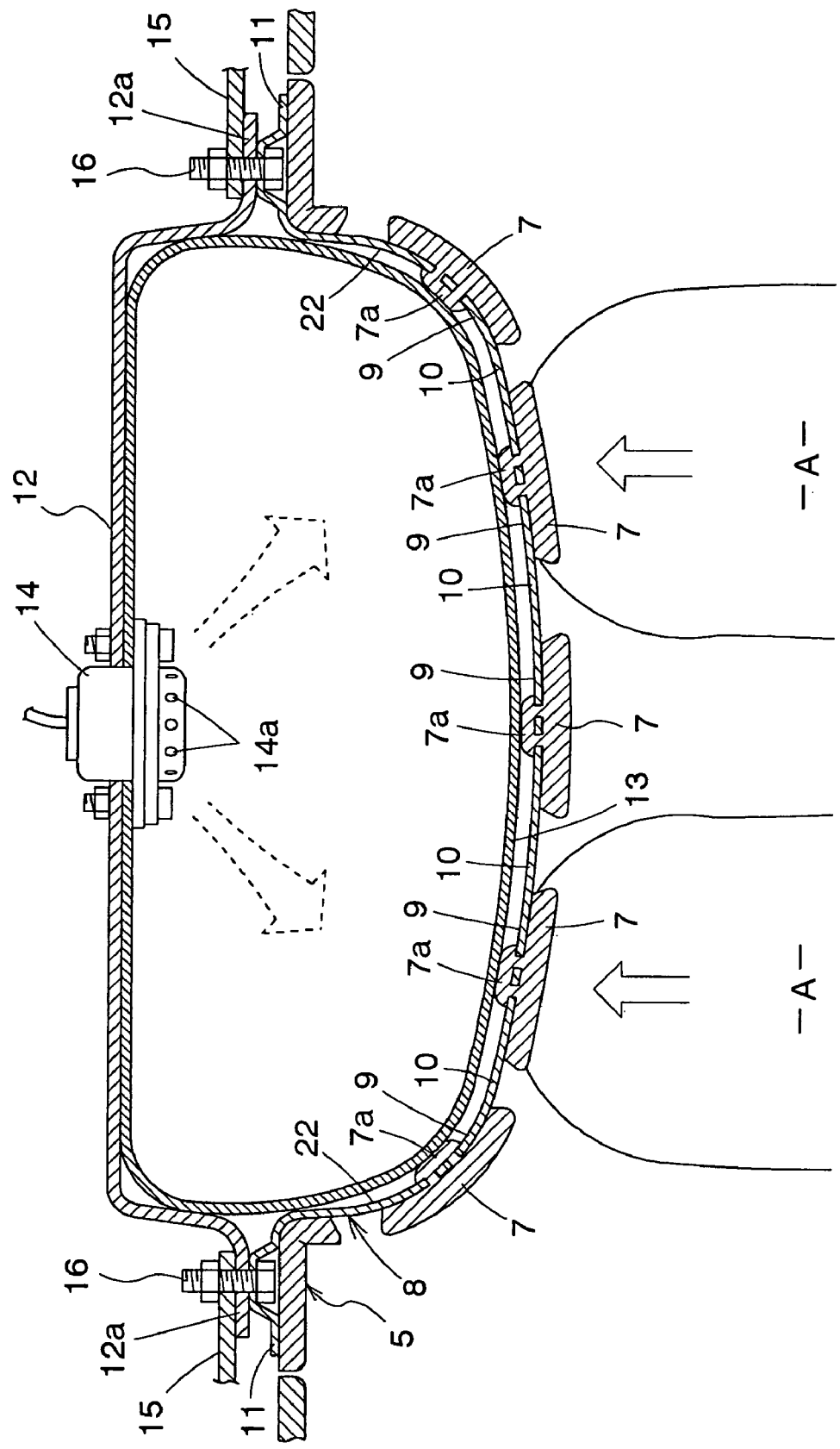
FIG. 4 is a cross sectional plan view showing a state in which the lower air bag has inflated from the state shown in FIG. 3 and the receiving portion and absorbing member have moved rapidly toward the seat.

With such inflation of the lower air bag 13, as shown in FIG. 1(b) and FIG. 4, the bend portions 10 and connecting portions 22 of the absorbing member 8 are extended by plastic deformation, which causes the face portions 9 of the absorbing member 8 to move away from each other. Then, the entire absorbing member 8, while maintaining its generally planar shape, rapidly moves toward the seat 1 positioned rearward. At this time, in the lower panel portion 5, the grooves 6 are broken to separate or divide the receiving portion 7 into a plurality of small segments. The receiving portion 7 rapidly moves together with the absorbing member 8 toward the seat 1 positioned rearward. At the same time, the air bag 4 provided in the steering wheel 3 is inflated as shown in FIG. 1(b).

In the state shown in FIG. 1(b) and FIG. 4 where the receiving portion 7 and the absorbing member 8 have rapidly moved toward the seat 1 positioned rearward, the driver's/passenger's right and left knee regions A are received and stopped by the receiving portion 7 and the absorbing member 8 when the driver's/passenger's waist is about to move forward along a seating portion 1a of the seat 1, thereby to restrain the driver's/passenger's waist from moving forward along the seating portion 1a of the seat 1.

In this case, the receiving portion 7 and the absorbing member 8 contact the driver's/passenger's right and left knee regions A, thereby tending to deform to a concave shape along the knee regions A. At this time, mainly the absorbing member 8, and more particularly, the bend portions 10 of the absorbing member 8 undergo a plastic deformation, thereby to deform the lower air bag 13. This absorbs an impact acting on the driver's/passenger's right and left knee regions A.

Since the flange portion 11 of the absorbing member 8 is connected to the brackets 15 through the bolts 16, the absorbing member 8 is prevented from moving beyond a predetermined position toward the seat 1 positioned rearward. The receiving portion 7 is attached to the absorbing member 8. More particularly, the projections 7a are heated and compressed to attach the receiving portion 7 to the absorbing member 8. Therefore, the receiving portion 7 and the absorbing member 8 never scatter toward the seat 1 positioned rearward.

Second Embodiment of the Invention

Figure 5:
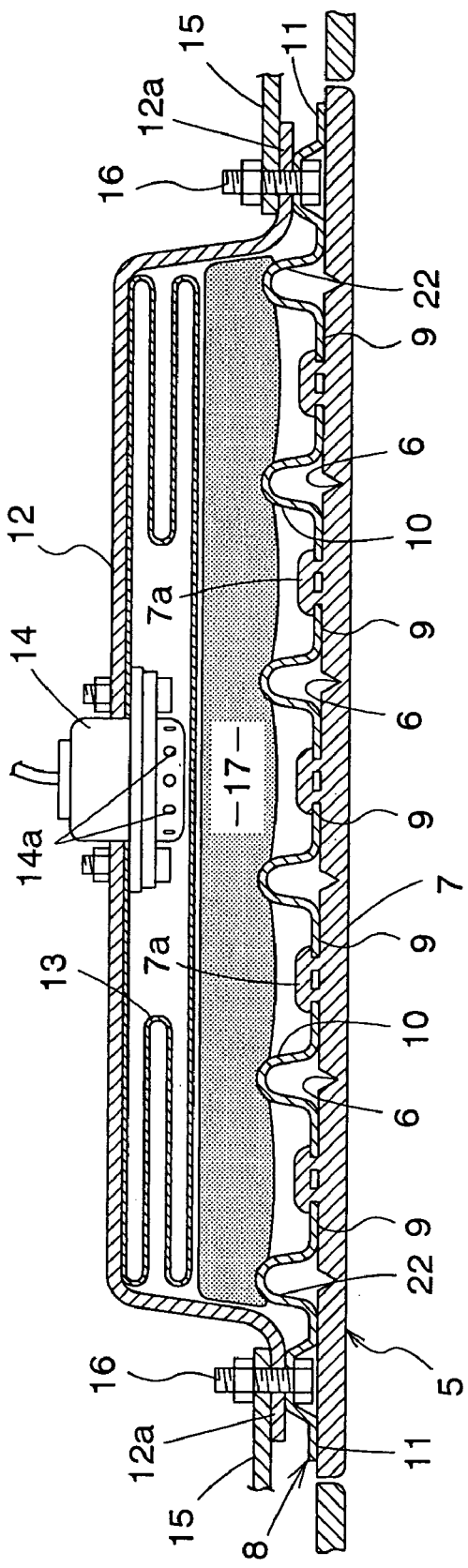
FIG. 5 is a cross sectional plan view of a region around the lower panel portion, receiving portion, absorbing member, lower air bag and inflator according to a second embodiment of the present invention.

In the foregoing embodiment of the invention, as shown in FIG. 5, a pad member 17 such as of a urethane material may be disposed between the absorbing member 8 and the lower air bag 13. In this case, the pad member 17, preferably, has a flat plate-like shape with a predetermined thickness.

Figure 6:
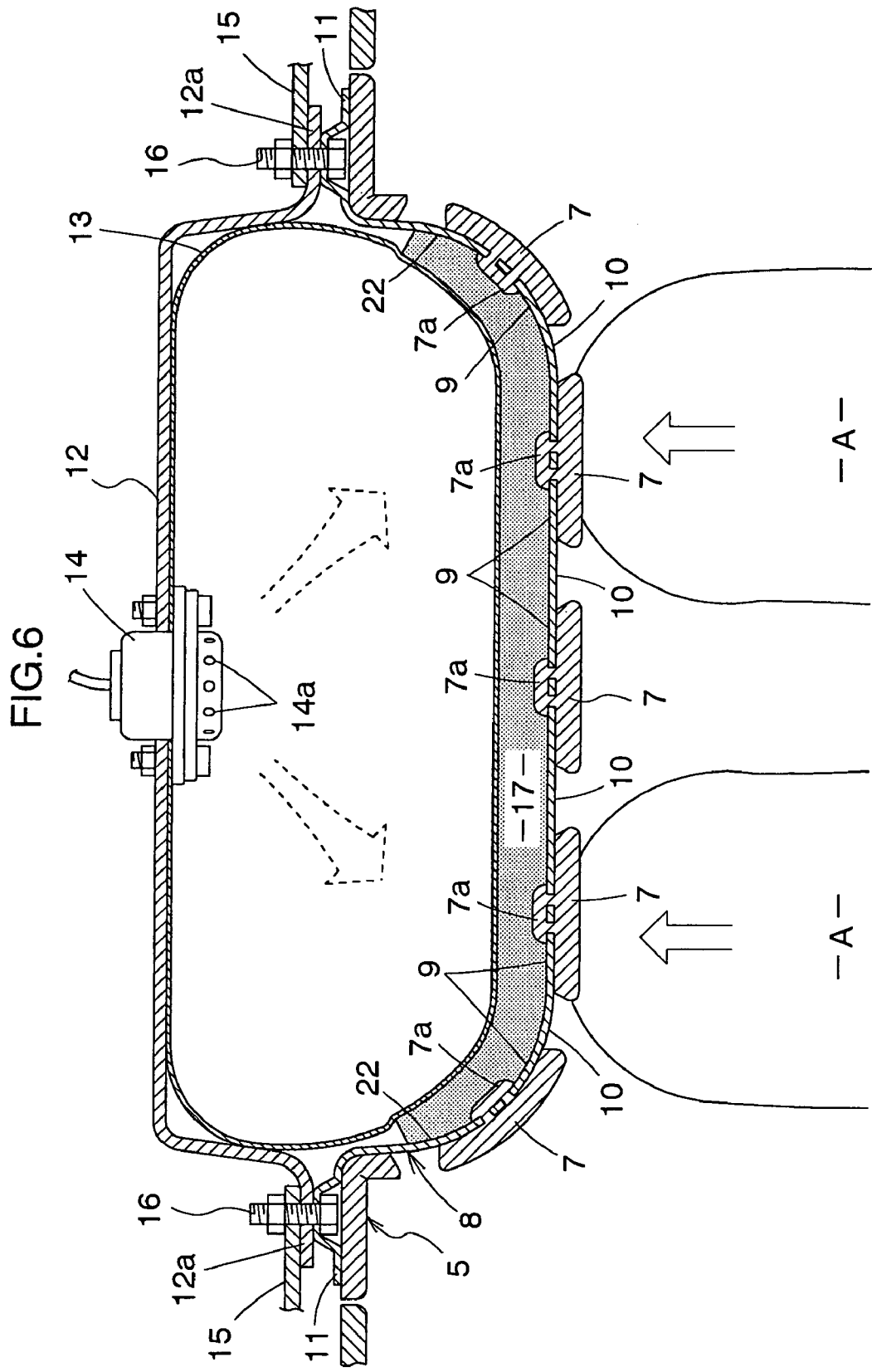
FIG. 6 is a cross sectional plan view showing a state in which the lower air bag has inflated from the state shown in FIG. 5 and the receiving portion and absorbing member have moved rapidly toward the seat.

According to such a construction, as illustrated in FIGS. 5 and 6, when the lower air bag 13 is inflated to push the absorbing member 8 toward the seat 1 positioned rearward, thereby to extend the bend portions 10 and the connecting portions 22 of the absorbing member 8 by plastic deformation to separate the face portions 9 of the absorbing member 8 from each other and rapidly move toward the seat 1 positioned rearward, the entire absorbing member 8 is maintained in a general planar shape by to the pad member 17.

Third Embodiment of the Invention

Figure 7:
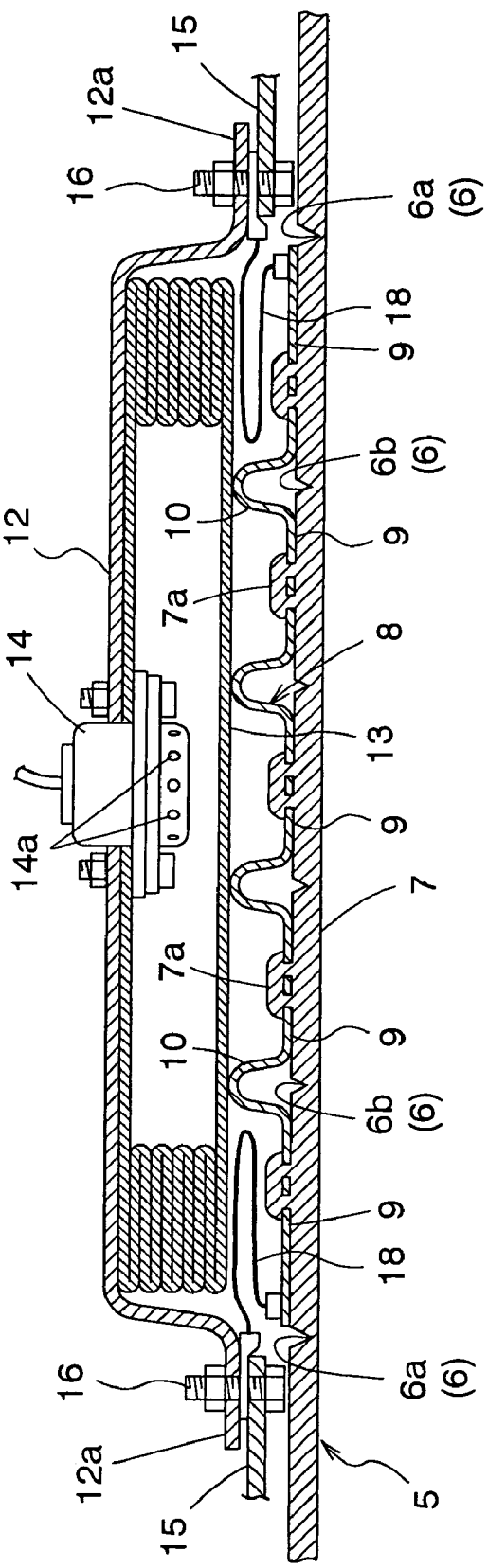
FIG. 7 is a cross sectional plan view of a region around the lower panel portion, receiving portion, absorbing member, lower air bag and inflator according to a third embodiment of the present invention.
Figure 8:
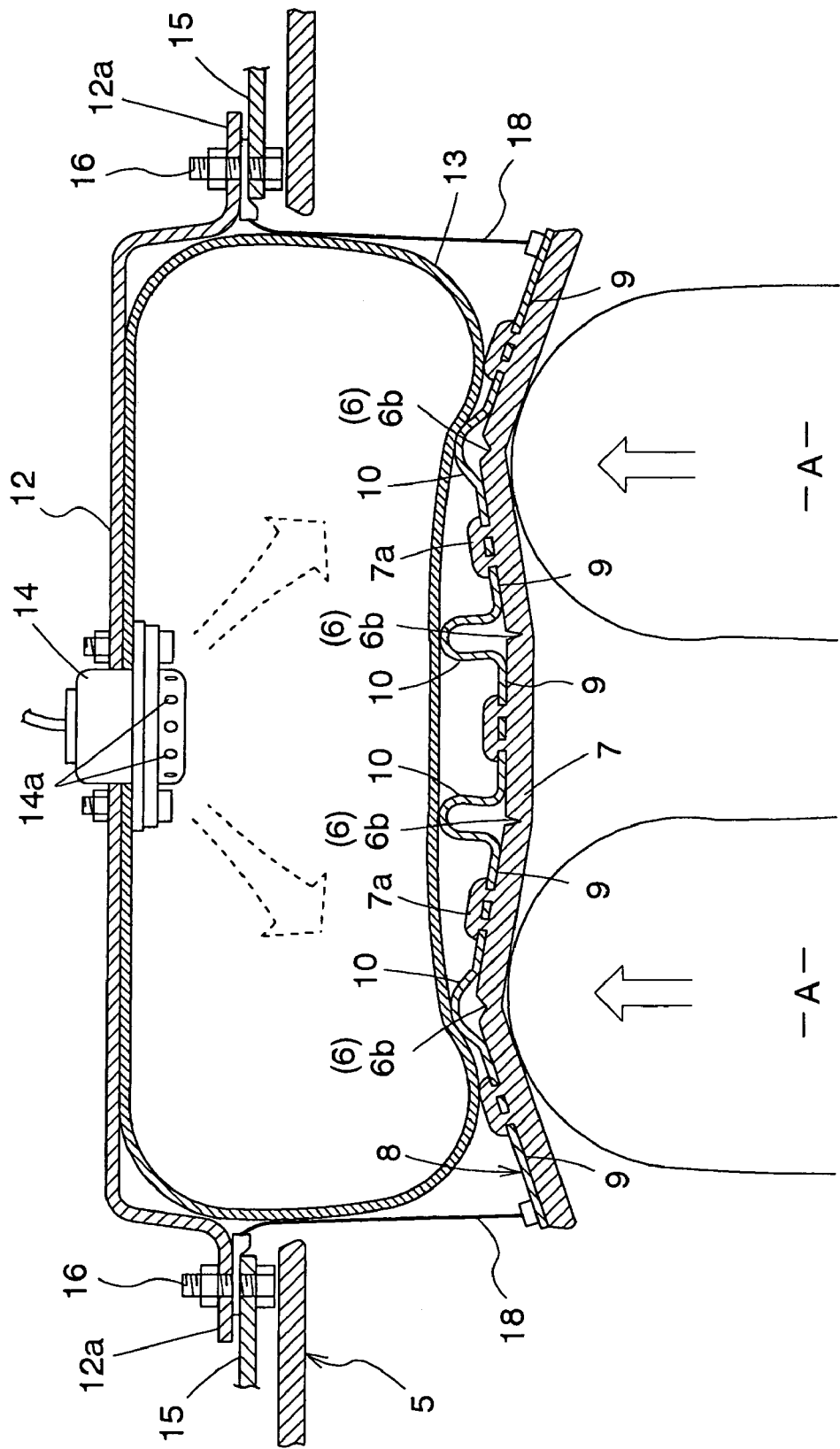
FIG. 8 is a cross sectional plan view showing a state in which the lower air bag has inflated from the state shown in FIG. 7 and the receiving portion and absorbing member have moved rapidly toward the seat.

The present invention may be constructed as shown in FIGS. 7 and 8 instead of the above-described first embodiment or the second embodiment.

In the first and second embodiments set forth above, as illustrated in FIGS. 3 and 5, the flange portion 12a of the supporting member 12 and the flange portion 11 of the absorbing member 8 are connected through the bolts 16 to the brackets 15 disposed inside the instrument panel 2. On the other hand, in FIG. 7, only the flange portion 12a of the supporting member 12 is connected to the brackets 15 through the bolts 16.

The flange portion 11 and connecting portions 22 of the absorbing member 8 (see FIGS. 2 and 3) are eliminated, and wires 18 are provided to connect the brackets 15 and the absorbing member 8. In this case, these wires 18 are slightly loose. With respect to the grooves 6, the outermost grooves 6a are formed deeper than the inner grooves 6b to be easily breakable. The other parts have the same constructions as shown in FIGS. 2 and 3. Also, a pad member 17 as shown in FIG. 5 may be disposed between the absorbing member 8 and the lower air bag 13 in the construction shown in FIG. 7.

With the above construction, when the collision sensor provided on the vehicle body detects a collision, the enhancer is ignited by the igniter in the inflator 14. The gas generating agent is combusted by combustion of the enhancer, whereby a gas generated from the gas generating agent is injected radially toward the outer peripheries from the injection openings 14a. The gas flows from the peripheries of the lower air bag 13 to the center of the lower air bag 13, thereby to inflate the lower air bag 13 to push the absorbing member 8 toward the seat 1 positioned rearward. As a result, as shown in FIG. 8, the outermost grooves 6a are broken, and the receiving portion 7 and the absorbing member 8 rapidly move toward the seat 1 positioned rearward without extending the bend portions 10 of the absorbing member 8 excessively and without breaking the inner grooves 6b too much.

Thus, as shown in FIG. 8, the receiving portion 7 and the absorbing member 8 receive and stop the driver's/passenger's right and left knee regions A as the driver's/passenger's waist is about to move forward along the seating portion 1a of the seat 1. Then, each groove 6b is bent to allow the entire receiving portion 7 to deform to a concave shape to conform to the shapes of the driver's/passenger's right and left knee regions A. In parallel with this, the adjacent face portions 9 of the absorbing member 8 are moved toward or away from each other while the bend portions 10 of the absorbing member 8 are bent and extended, whereby the entire absorbing member 8 is deformed to a concave shape to fit to the shapes of the driver's/passenger's right and left knee regions A. In this way, the impact acting on the driver's/passenger's right and left knee regions A is absorbed.

Since the wires 18 are disposed between the brackets 15 and the absorbing member 8, the absorbing member 8 is prevented from moving beyond a predetermined position toward the seat 1 positioned rearward. Also, the receiving portion 7 is attached to the absorbing member 8. More particularly, the projections 7a are heated and compressed, thereby to attach the receiving portion 7a to the absorbing member 8. This prevents the receiving portion 7 and the absorbing member 8 from scattering toward the seat 1 positioned rearward.

Fourth Embodiment of the Invention

Figure 9:
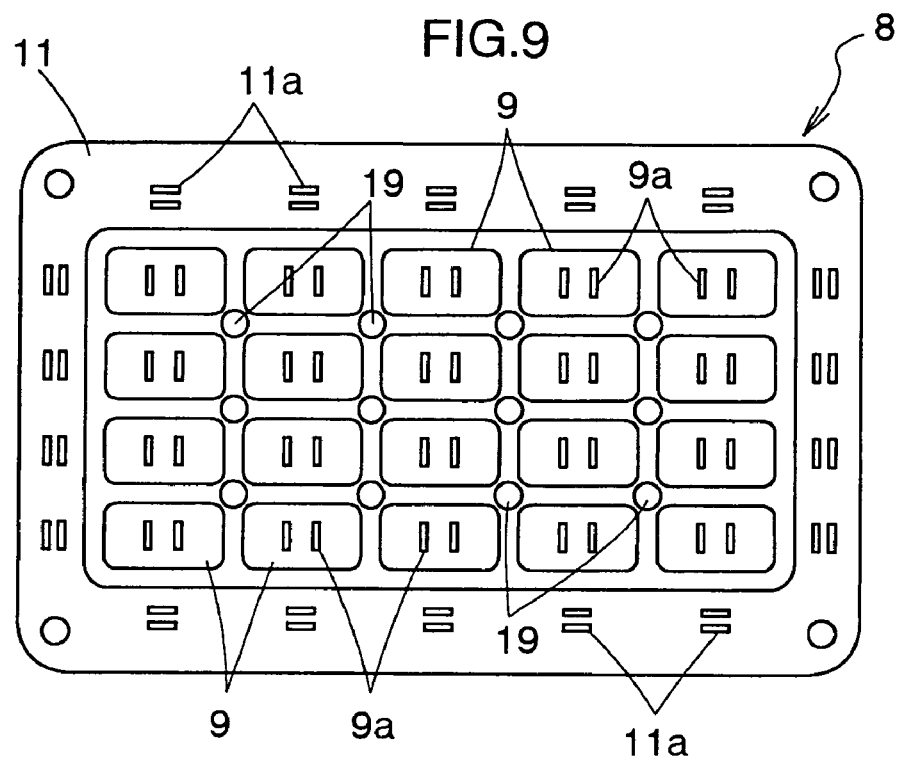
FIG. 9 is a front view of the absorbing member according to a fourth embodiment of the present invention.
Figure 10:
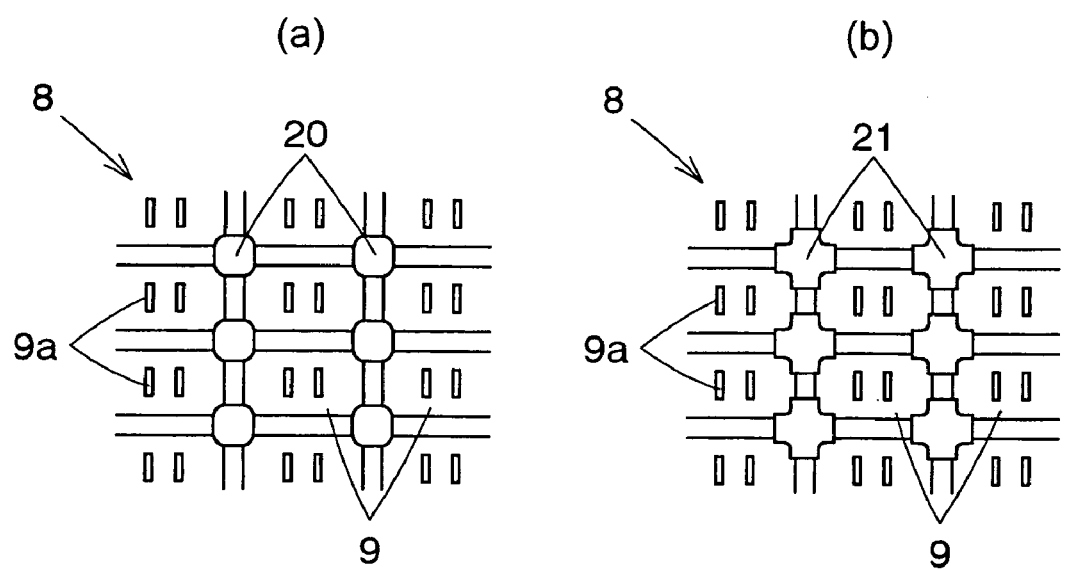
FIG. 10 is front views of a region around holes of the absorbing member according to the fourth embodiment of the present invention.

In the above-described first embodiment through the third embodiment of the invention, as shown in FIG. 9 and FIGS. 10(a) and (b), it is possible to provide small round apertures 19, rectangular apertures 20 or cross-shaped apertures 21 in positions of the bend portions 10 between four face portions 9 of the absorbing member 8. With this, the apertures 19, 20 or 21 facilitate plastic deformation of the bend portions 10 of the absorbing member 8 to enhance response of the absorbing member 8 when deformed by inflation of the lower air bag 13.

Fifth Embodiment of the Invention

Figure 11:
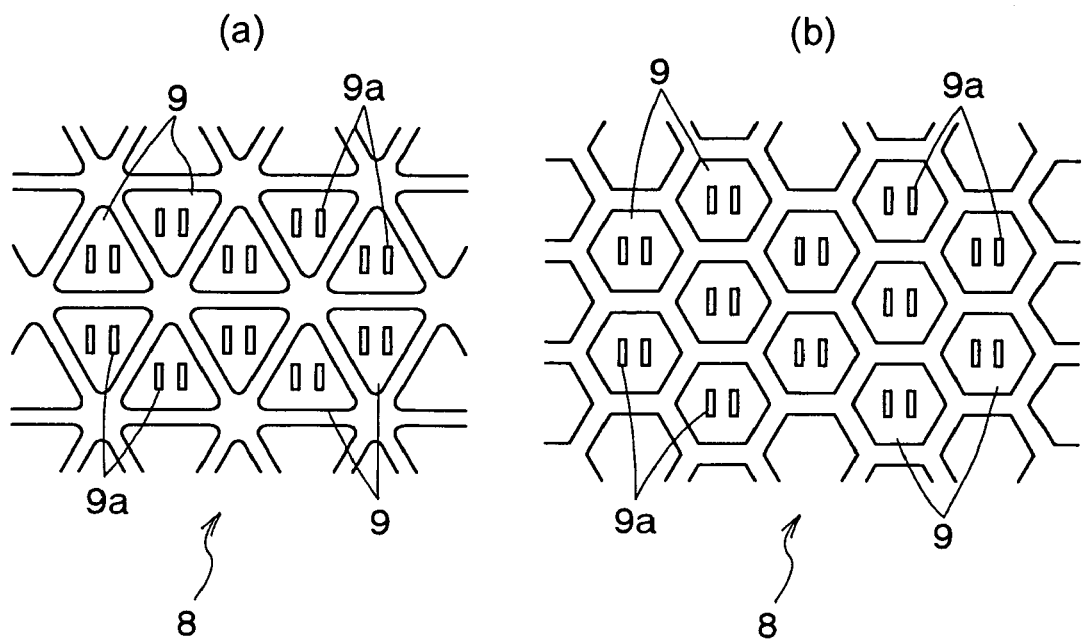
FIG. 11 is front views of a region around face portions of the absorbing member according to a fifth embodiment of the present invention.

In the above-described first embodiment through the fourth embodiment of the invention, each of the face portions 9 of the absorbing member 8 may be formed triangular as shown in FIG. 11(a) or hexagonal as shown in FIG. 11(b), instead of being rectangular.

Sixth Embodiment of the Invention

Instead of the constructions shown in the above-described first embodiment through the fifth embodiment of the invention, the construction as shown in FIGS. 12, 13, 14, 15 and 16 may be employed.

Figure 13:
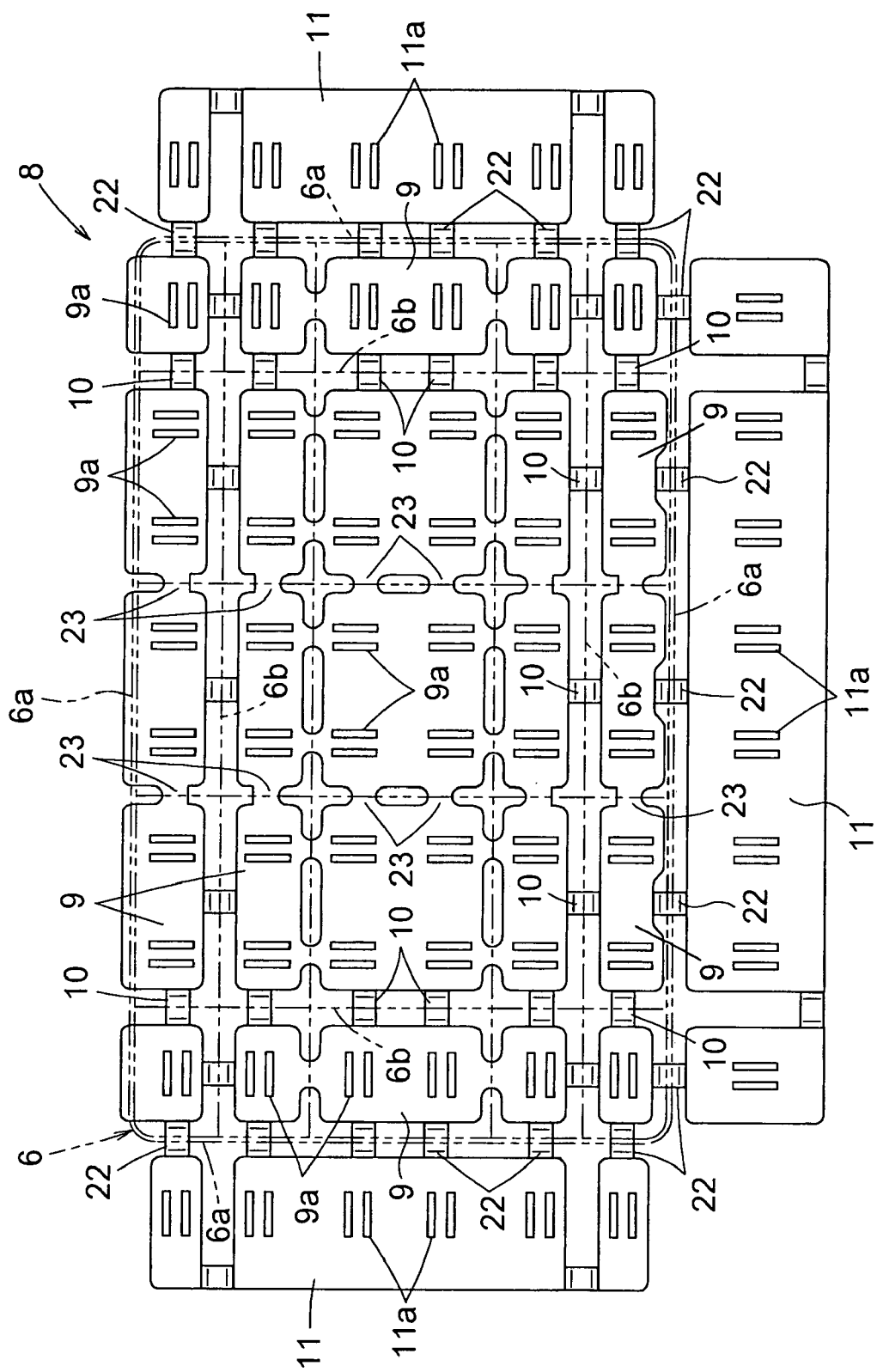
FIG. 13 is a front view of the absorbing member according to the sixth embodiment of the present invention.
Figure 14:
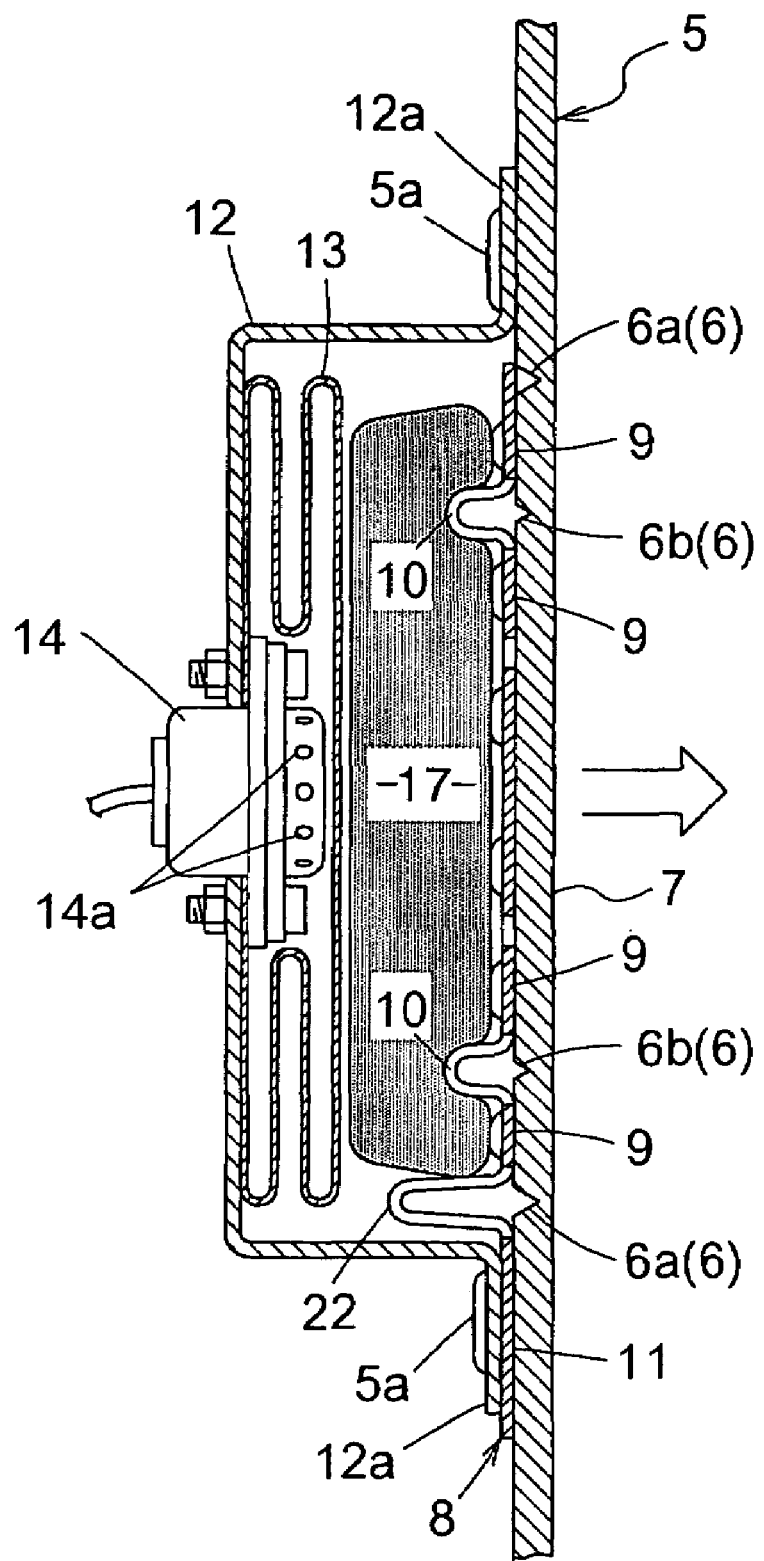
FIG. 14 is a vertical sectional side view of a region around the lower panel portion, receiving portion, absorbing member, lower air bag and inflator according to the sixth embodiment of the present invention.
Figure 15:
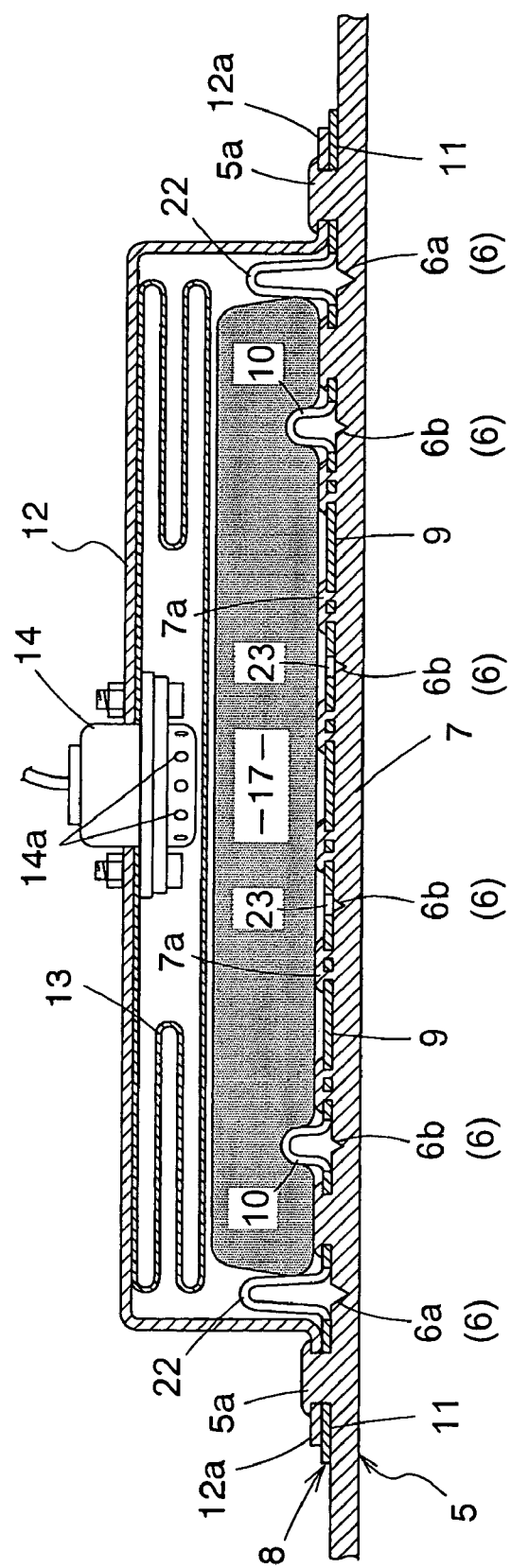
FIG. 15 is a cross sectional plan view of a region around the lower panel portion, receiving portion, absorbing member, lower air bag and inflator according to the sixth embodiment of the present invention.

As illustrated in FIGS. 13, 14 and 15, the absorbing member 8 includes a plurality of face portions 9 of rectangular shape in front view, a plurality of narrow planar connecting portions 23 for interconnecting the adjacent face portions 9 particularly in regions adjacent the central part thereof, and a plurality of narrow bend portions 10 projecting opposite from the surfaces of the face portions 9 for interconnecting the adjacent face portions 9 in regions adjacent the outer peripheries thereof. A plurality of narrow connecting portions 22 are formed integrally with the outer peripheries of the face portions 9. These connecting portions 22 are bent to project opposite from the surfaces of the face portions 9 in a similar way to the bend portions 10. Plate-like flange portions 11 are formed integrally with the connecting portions 22. The face portions 9 and the flange portions 11 have small rectangular apertures 9a and 11a, respectively.

In this case, as shown in FIGS. 14 and 15, the connecting portions 22 of the absorbing member 8 have a length greater than the length of the bend portions 10 of the absorbing member 8. Thus, the amount of projection of the connecting portions 22 of the absorbing member 8 in the opposite direction from the surfaces of the face portions 9 is set to be greater than the amount of projection of the bend portions 10 of the absorbing member 8 in the opposite direction from the surfaces of the face portions 9.

As illustrated in FIGS. 13 and 14, the flange portions 11 and the connecting portions 22 are provided on the lower side and the right and left sides of the absorbing member 8 while no flange portion 11 or connecting portion 22 is provided on the upper side of the absorbing member 8.

As shown in FIGS. 13, 14 and 15, the plate-like connecting portions 23, the bend portions 10 and the connecting portions 22 of the absorbing member 8 are arranged in positions opposed to the grooves 6 of the lower panel portion 5. The outermost grooves 6a of the grooves 6 (the grooves 6a opposed to the connecting portions 22 of the absorbing member 8) are deeper than the inner grooves 6b (the grooves 6b opposed to the plate-like connecting portions 23 and the bend portions 10 of the absorbing member 8) to be easily breakable. The pad member 17 (see FIG. 5) is disposed between the absorbing member 8 and the lower air bag 13. The lower air bag 13 in this embodiment is slightly larger than the lower air bag 13 described in the above first embodiment through the third embodiment of the invention. The projections 5a of the lower panel portion 5 are inserted into the openings 11a of the flange portions 11 and further into the openings of the flange portion 12a of the supporting member 12 to be heated and compressed, thereby to attach the flange portions 11 of the absorbing member 8 and the flange portion 12a of the supporting member 12 together to the back surface of the lower panel portion 5. The other parts have the same constructions as the first embodiment of the invention shown in FIGS. 2 and 3.

With the above construction, when the collision sensor provided on the vehicle body detects a collision, the enhancer is ignited by the igniter in the inflator 14. The gas generating agent is combusted by combustion of the enhancer, whereby a gas generated from the gas generating agent is injected radially toward the outer peripheries direction from the injection openings 14a. The gas flows from the peripheries of the lower air bag 13 to the center of the lower air bag 13, thereby to inflate the lower air bag 13 to push the absorbing member 8 toward the seat 1 positioned rearward. As a result, as shown in FIG. 16, the outermost grooves 6a are broken, and the receiving portion 7 and the absorbing member 8 rapidly move toward the seat 1 positioned rearward, with the bend portions 10 and the connecting portions 22 of the absorbing member 8 extended and with the inner grooves 6b not being broken too much.

Figure 12:
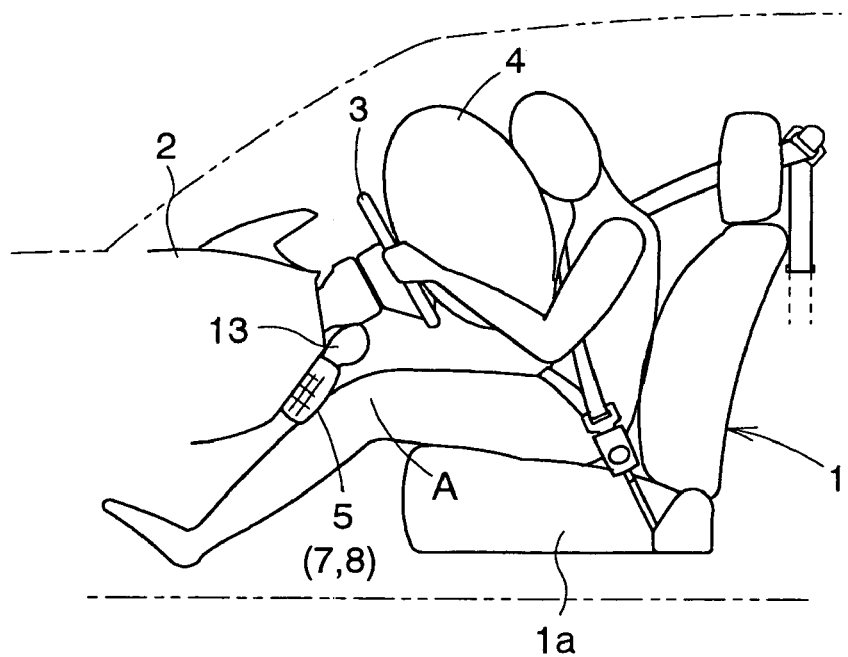
FIG. 12 is a side view of a region around the seat and instrument panel according to a sixth embodiment of the present invention.
Figure 16:
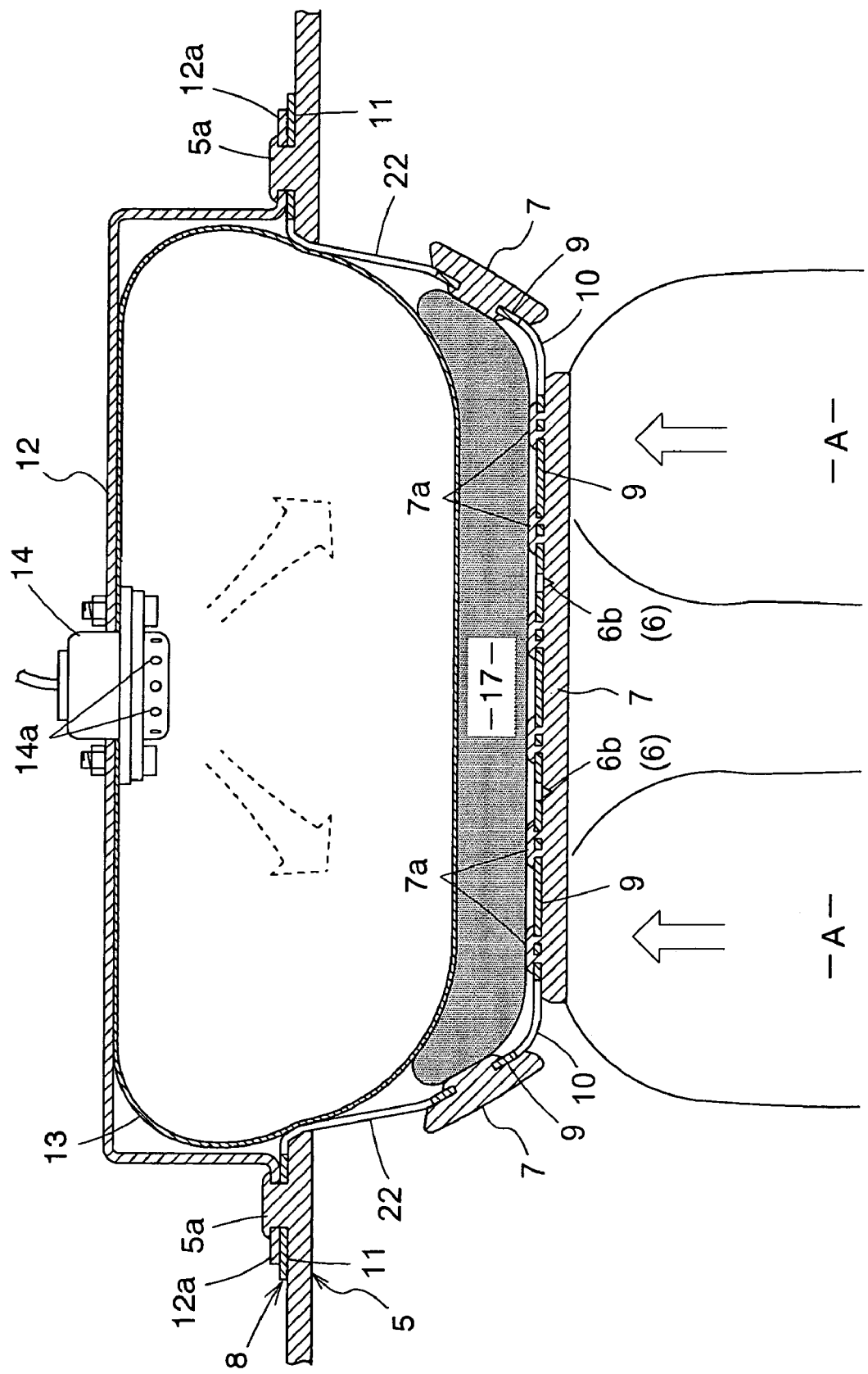
FIG. 16 is a cross sectional plan view showing a state in which the lower air bag has inflated from the state shown in FIG. 15 and the receiving portion and absorbing member have moved rapidly toward the seat.

As illustrated in FIG. 16, since the flange portions 11 of the absorbing member 8 are connected to the instrument panel 2, the receiving portion 7 and the absorbing member 8 are prevented from moving beyond a predetermined position toward the seat 1 positioned rearward. While the connecting portions 22 are provided on the bottom side and the right and left sides of the absorbing member 8 and the receiving portion 7, no connecting portion 22 is provided on the upper side of the absorbing member 8 and the receiving portion 7. Therefore, as shown in FIG. 12, a gap is produced between the instrument panel 2 and the receiving portion 7 and absorbing member 8 as the lower air bag 13 is inflated to push the absorbing member 8 toward the seat 1 positioned rearward, from which the lower air bag 13 is developed upward.

With this construction, when the receiving portion 7 and the absorbing member 8 receive and stop the driver's/passenger's right and left knee regions A as the driver's/passenger's waist is about to move forward along the seating portion 1a of the seat 1, each groove 6b is bent to allow the entire receiving portion 7 to deform to a concave shape to fit to the shapes of the driver's/passenger's right and left knee regions A. In parallel with this, the entire absorbing member 8, similarly to the receiving portion 7, deforms to a concave shape to fit to the shapes of the driver's/passenger's right and left knee regions A. As noted above, a portion of the lower air bag 13 expanding upward receives and stops the driver's/passenger's other body parts than the right and left knee regions A or receives and stops the driver's/passenger's right and left knee regions A when displaced upward from the receiving portion 7.

Seventh Embodiment of the Invention

The present invention may be constructed as shown in FIGS. 17, 18, 19 and 20, instead of the constructions described in the above first embodiment through the sixth embodiment of the invention.

Figure 17:
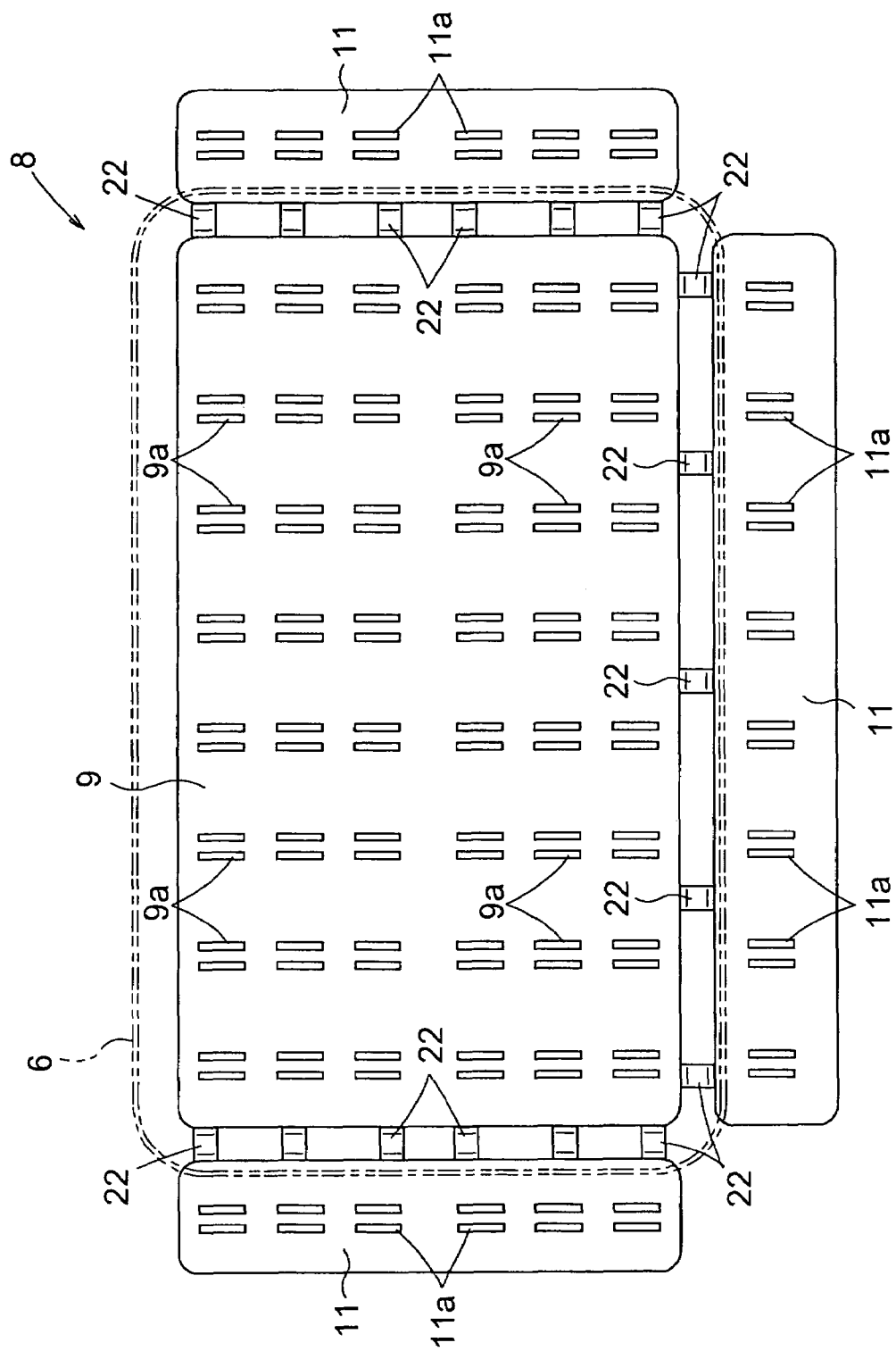
FIG. 17 is a front view of the absorbing member according to a seventh embodiment of the present invention.
Figure 18:
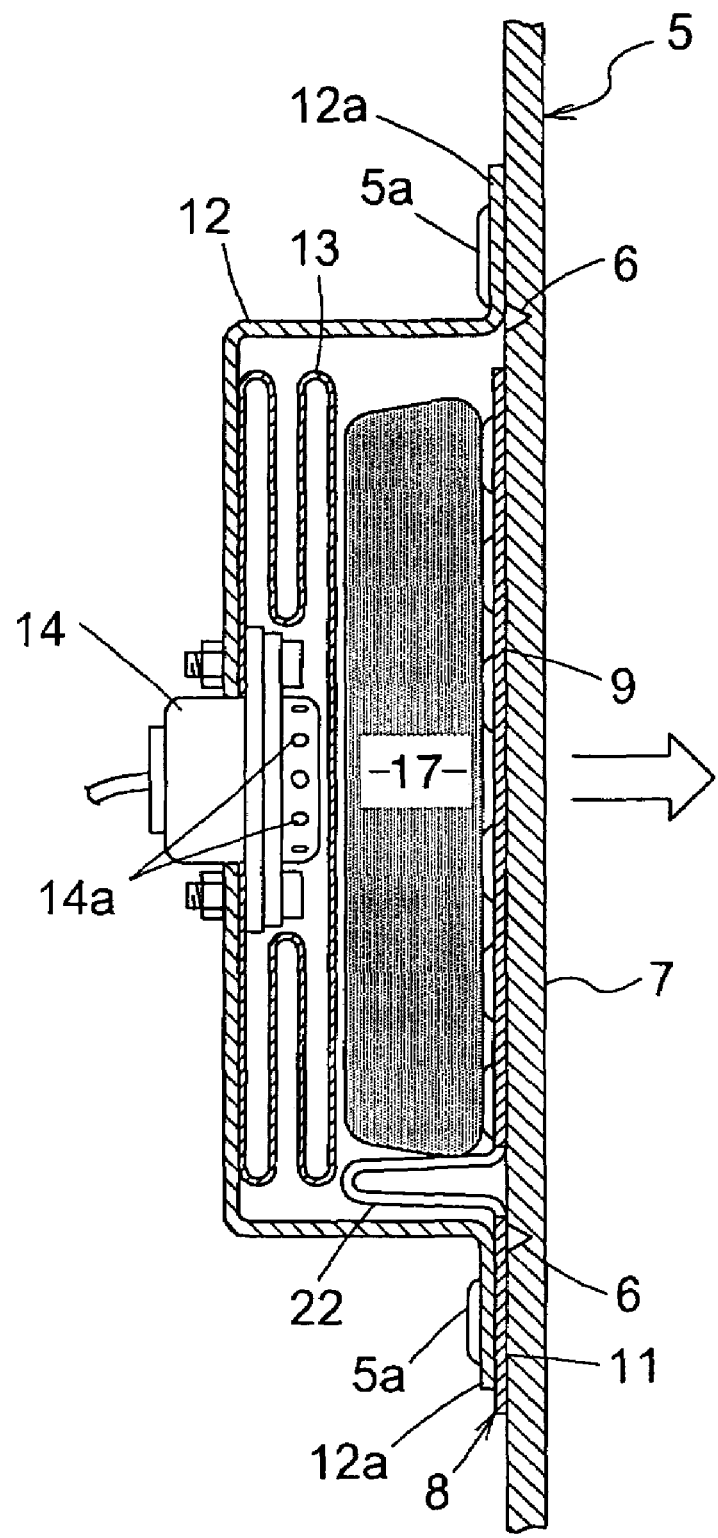
FIG. 18 is a vertical sectional side view of a region around the lower panel portion, receiving portion, absorbing member, lower air bag and inflator according to the seventh embodiment of the present invention.
Figure 19:
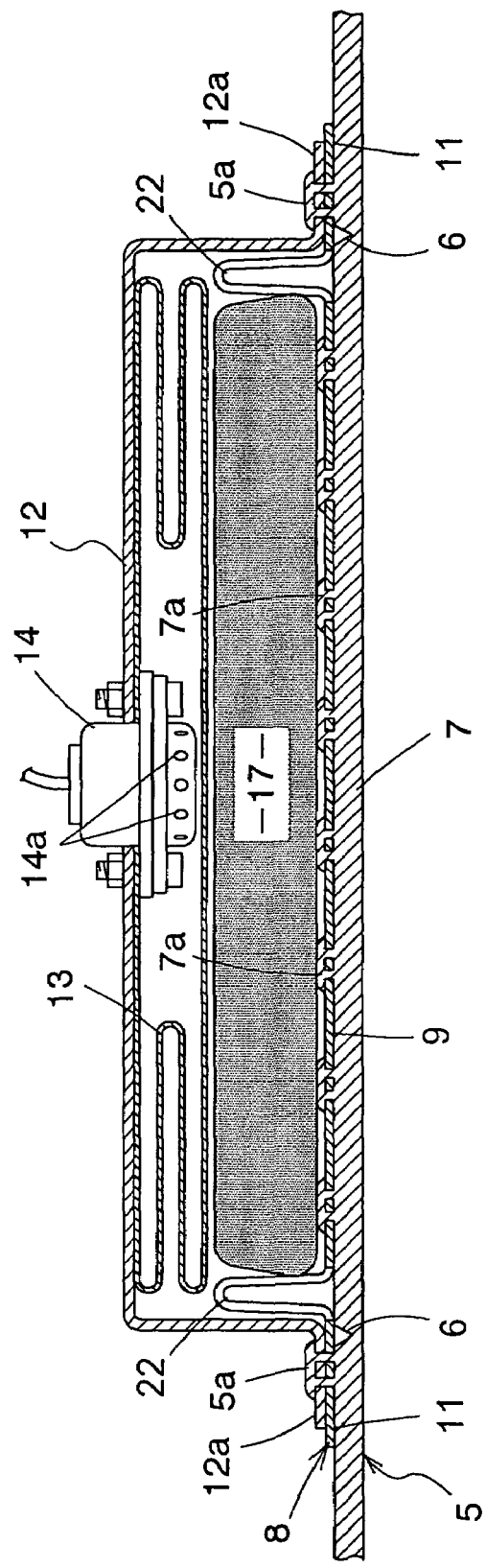
FIG. 19 is a cross sectional plan view of a region around the lower panel portion, receiving portion, absorbing member, lower air bag and inflator according to the seventh embodiment of the present invention.

As illustrated in FIGS. 17, 18 and 19, one groove 6 is formed in a rectangular contour in the back surface of the lower panel portion 5 while no groove is formed in regions adjacent the center of the panel. Thus, one rectangular receiving portion 7 is formed on the lower panel portion 5.

The absorbing member 8 includes one face portion 9 of rectangular shape in front view, and a plurality of narrow connecting portions 22 formed integrally with outer peripheries of the face portion 9. The connecting portions 22 are bent to project in the opposite direction from the surface of the face portion 9. Plate-like flange portions 11 are formed integrally with the connecting portions 22. The face portion 9 and the flange portions 11 include small rectangular openings 9a and 11a, respectively. The flange portions 11 and the connecting portions 22 are provided on the bottom side and the right and left sides of the absorbing member 8 while no flange portion or connecting portion is provided on the upper side of the absorbing member 8.

As illustrated in FIGS. 17, 18 and 19, the connecting portions 22 of the absorbing member 8 are arranged in positions substantially opposed to the groove 6 of the lower panel portion 5. Further, the pad member 17 (see FIG. 5) is disposed between the absorbing member 8 and the lower air bag 13. The lower air bag 13 is slightly larger than the lower air bag 13 described in the first embodiment through the third embodiment noted above. The other parts have the same constructions as the first embodiment of the invention shown in FIGS. 2 and 3 and the sixth embodiment of the invention shown in FIGS. 14 and 15.

With the above construction, when the collision sensor provided on the vehicle body detects a collision, the enhancer is ignited by the igniter in the inflator 14. The gas generating agent is combusted by combustion of the enhancer, whereby a gas generated from the gas generating agent is injected radially toward outer peripheries from the injection openings 14a. The gas flows from the peripheries of the lower air bag 13 to the center of the lower air bag 13, thereby to inflate the lower air bag 13 to push the absorbing member 8 toward the seat 1 positioned rearward. As a result, as shown in FIG. 20, the groove 6 is broken to extend the connecting portions 22 of the absorbing member 8, and the receiving portion 7 and the absorbing member 8 rapidly move toward the seat 1 positioned rearward while maintaining their generally planar shape due to the absence of any groove in the receiving portion 7.

Figure 20:
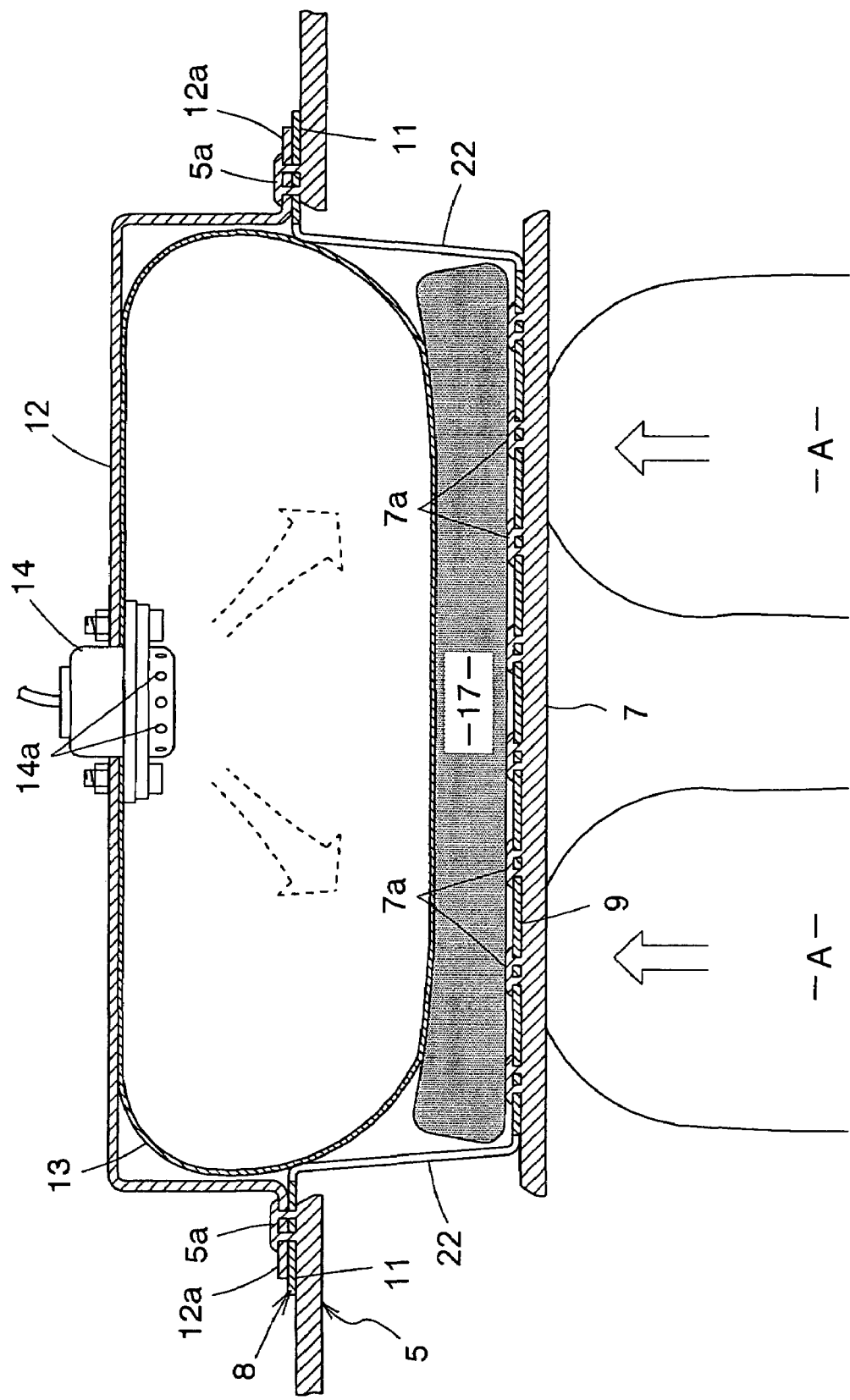
FIG. 20 is a cross sectional plan view showing a state in which the lower air bag has inflated from the state shown in FIG. 19 and the receiving portion and absorbing member have moved rapidly toward the seat.

As shown in FIG. 20, since the flange portions 11 of the absorbing member 8 are connected to the instrument panel 2, the receiving portion 7 and the absorbing member 8 are prevented from moving beyond a predetermined position toward the seat 1 positioned rearward. While the connecting portions 22 are provided on the bottom side and the right and left sides of the absorbing member 8 and the receiving portion 7, no connecting portion 22 is provided on the upper side of the absorbing member 8 and the receiving portion 7. Therefore, a gap is produced between the instrument panel 2 and the receiving portion 7 and absorbing member 8 as the lower air bag 13 is inflated to push the absorbing member 8 toward the seat 1 positioned rearward, from which the lower air bag 13 is developed upward.

With this construction, when the receiving portion 7 and the absorbing member 8 receive and stop the driver's/passenger's right and left knee regions A as the driver's/passenger's waist is about to move forward along the seating portion 1a of the seat 1, the entire receiving portion 7 deforms to a concave shape to fit to the shapes of the driver's/passenger's right and left knee regions A. In parallel with this, the entire absorbing member 8, similarly to the receiving portion 7, deforms to the concave shape to fit to the shapes of the driver's/passenger's right and left knee regions A. As noted above, a portion of the lower air bag 13 expanded upward receives and stops the driver's/passenger's other body parts than the right and left knee regions A or receives and stops the driver's/passenger's right and left knee regions A when displaced upward from the receiving portion 7.

Eighth Embodiment of the Invention

Figure 21:
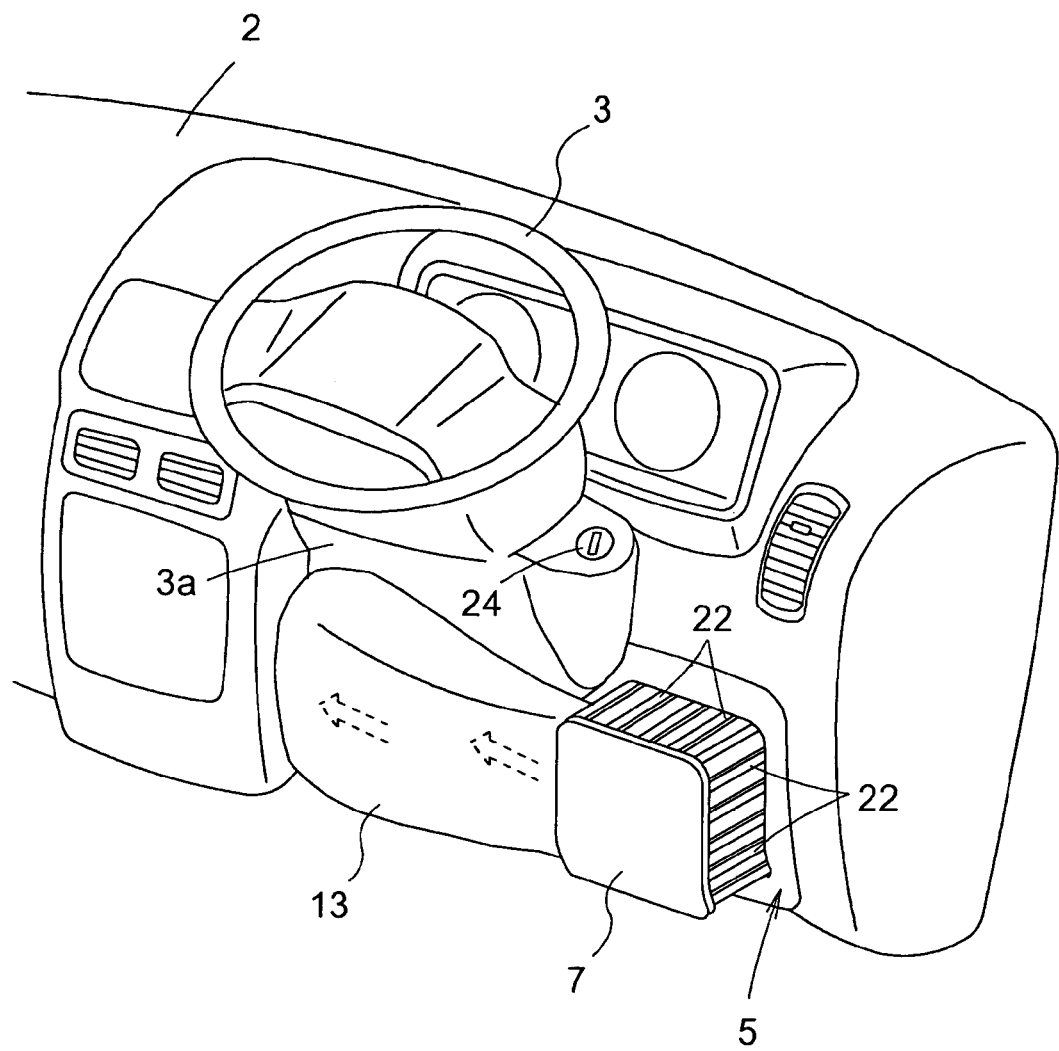
FIG. 21 is a perspective view of a region around a steering wheel and the receiving portion according to an eighth embodiment of the present invention.

In the sixth embodiment and the seventh embodiment of the invention set forth above, as shown in FIG. 21, when the receiving portion 7 is arranged at the right lateral side of a proximal portion 3a of the steering wheel 3 in a portion of the instrument panel 2 adjacent the driver's seat 1, the flange portions 11 and the connecting portions 22 may be provided on the upper side, the bottom side and the right side of the absorbing member 8 while no flange portion and connecting portion is provided on the left side of the absorbing member 8.

Therefore, as shown in FIG. 21, a gap is produced between the instrument panel 2 and the receiving portion 7 and absorbing member 8 as the lower air bag 13 is inflated to push the absorbing member 8 toward the seat 1 positioned rearward, from which the lower air bag 13 is developed leftward. With this construction, the receiving portion 7 and the absorbing member 8 receive and stop the driver's/passenger's right knee region A as the driver's/passenger's waist is about to move forward along the seating portion 1a of the seat 1, and a portion of the lower air bag 13 expanded leftward receives and stops the driver's/passenger's body parts other than the right and left knee regions A or receives and stops the driver's/passenger's left knee region A.

In the construction shown in FIG. 21, the lower air bag 13 may be constructed to develop upward as well as leftward, e.g. in an inverted L-shape in front view, whereby the lower air bag 13 as developed upward may cover a key cylinder 24.

Ninth Embodiment of the Invention

Figure 22:
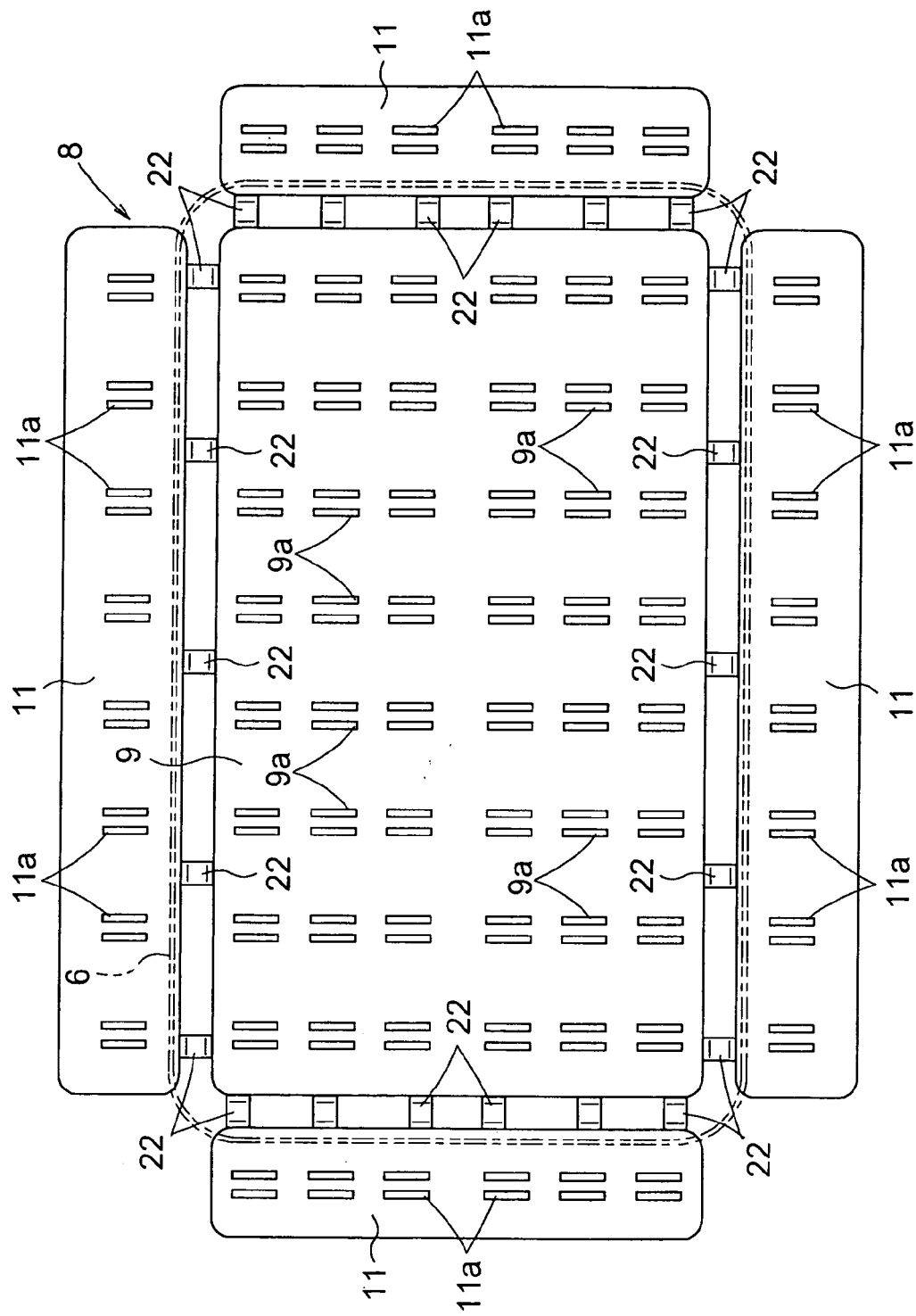
FIG. 22 is a front view of the absorbing member according to a ninth embodiment of the present invention.
Figure 23:
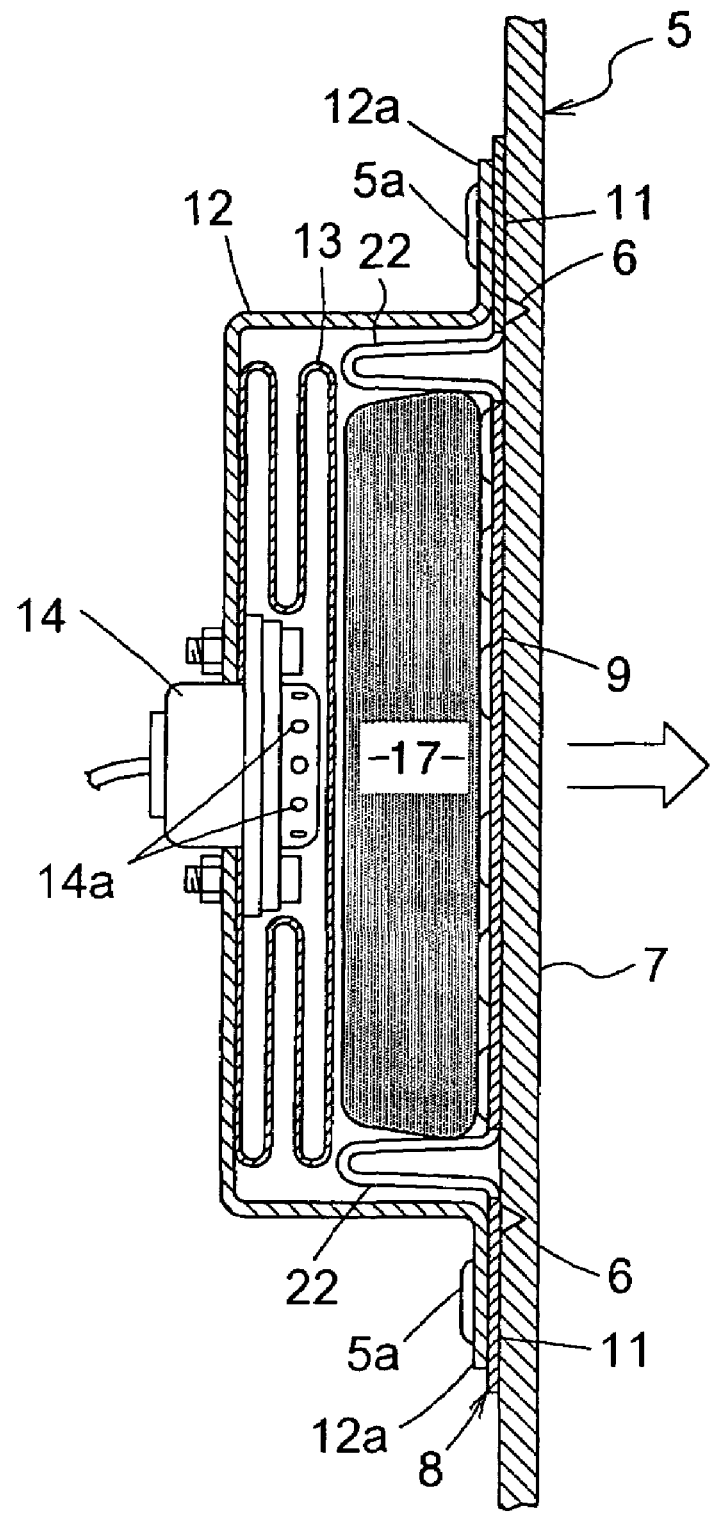
FIG. 23 is a vertical sectional side view of a region around the lower panel portion, receiving portion, absorbing member, lower air bag and inflator according to the ninth embodiment of the present invention.

In the seventh embodiment of the invention noted above, as shown in FIGS. 22 and 23, the flange portions 11 and the connecting portions 22 may be provided on the upper side, the bottom side, and the right and left sides of the absorbing member 8. The lower air bag 13 may be the same size as the lower air bag 13 of the first embodiment through the third embodiment of the invention as described above.

With this construction, when the lower air bag 13 is inflated, the receiving portion 7 as well as the absorbing member 8 rapidly move toward the seat 1 positioned rearward while maintaining their generally planar shape due to the lower air bag 13. The lower air bag 13 does not develop upward or sideways. The receiving portion 7 and the absorbing member 8 maintain their generally planar shape because of the absence of any groove 6 in the receiving portion 7.

Tenth Embodiment of the Invention

In the first embodiment through the ninth embodiment of the invention set forth above, the projections 5a and 7a of the lower panel portion 5 and the receiving portion 7 are dispensable, and the openings 9a and 11a of the face portions 9 and the flange portions 11 of the absorbing member 8 are also dispensable. Instead, the face portions 9 and the flange portions 11 of the absorbing member 8 may be bonded to the back surface of the lower panel portion 5 and the receiving portion 7 by an adhesive.

Other Embodiments of the Invention

In the first embodiment through the ninth embodiment of
In the first embodiment through the ninth embodiment of the invention set forth above, the instrument panel 2 and the lower panel portion 5 need not necessarily be provided as separate members. Instead, the lower panel portion 5 may be formed integrally with the instrument panel 2.

Also, instead of the grooves 6, 6a and 6b, slits may be provided at predetermined intervals, in form of perforations, thereby to form the receiving portion 7 integrally with the lower panel portion 5.

The present invention may be applied not only to the seat 1 of the driver (driver's seat) but also to a passenger seat (not shown).

In the first embodiment and the second embodiment through the ninth embodiment of the invention described above, the lower air bag 13 may be manufactured by sewing cloths together.

INDUSTRIAL UTILITY

The instrument panel construction for a vehicle according to the present invention is capable of receiving and stopping the driver's/passenger's knees or adjacent parts to prevent the driver's/passenger's waist from moving forward along a seating portion of a seat as a great impact acts on the vehicle, thereby to enhance the effect of the driver's/passenger's upper body being received and stopped by an air bag. In addition, the construction is also capable of receiving and stopping an impact acting on the driver's/passenger's knee or adjacent parts, which may preferably be used as a protective device for the driver/passenger in a vehicle such as a passenger vehicle, commercial vehicle, bus or the like.

The invention claimed is:

1. An instrument panel construction for a vehicle comprising:

a receiving portion (7) provided in a lower portion of an instrument panel (2) made of synthetic resin to be separable from the instrument panel (2); and a moving device for separating the receiving portion (7) from the instrument panel (2) and moving the receiving portion rapidly toward a seat (1) positioned rearward when a great impact acts on the vehicle, with an absorbing member (8) made of plastically deformable metal or reinforced synthetic resin being attached to a back surface of the receiving portion (7);

wherein the absorbing member (8) includes a plurality of face portions (9) arranged at predetermined intervals and bend portions (10) bent to project from the face portions (9) and interconnecting the adjacent face portions (9), and wherein the absorbing member (8) is attached to the back surface of the receiving portion (7) so that the face portions (9) contact the back surface of the receiving portion (7) while the bend portions (10) project away from the back surface of the receiving portion (7).

2. An instrument panel construction as claimed in claim 1, further comprising a preventing device for preventing the receiving portion (7) from moving beyond a predetermined position toward the seat (1) positioned rearward when the receiving portion (7) is separated from the instrument panel (2) by the moving device to move toward the seat (1) positioned rearward.

3. An instrument panel construction as claimed in claim 2, wherein the absorbing member (8) includes connecting portions (22) provided at outer peripheries thereof and bent and projecting away from the back surface of the receiving portions (7) to be connected to the instrument panel (2) before the receiving portion (7) is separated from the instrument panel (2), thereby to form the preventing device.

4. An instrument panel construction as claimed in any one of claims 1, through 3, wherein the receiving portion (7) is separable into a plurality of small segments.

5. An instrument panel construction as claimed in claim 1, further comprising an air bag (13) and an inflator (14) for rapidly inflating the air bag (13), provided on the back surface of the receiving portion (7), the air bag (13) and inflator (14) constituting the moving device.

6. An instrument panel construction as claimed in claim 5, wherein, when the receiving portion (7) is separated from the instrument panel (2) by inflation of the air bag (13) to move toward the seat (1) positioned rearward, the air bag (13) is developed outward from between the instrument panel (2) and the receiving portion (7).

7. An instrument panel construction as claimed in claim 5 wherein the air bag (13) is made of blow-molded synthetic resin.

8. An instrument panel construction as claimed in any one of claims 5 through 7, wherein a pad material (17) is provided between the absorbing member (8) and the air bag (13).

* * * * *

UNITED STATES PATENT AND TRADEMARK OFFICE
CERTIFICATE OF CORRECTION

PATENT NO. : 7,367,587 B2
APPLICATION NO. : 10/513775
DATED : May 6, 2008
INVENTOR(S) : Taoka It is certified that error appears in the above-identified patent and that said Letters Patent is hereby corrected as shown below:

Title Page Item (56) References Cited, U.S. PATENT DOCUMENTS, pages 1 and 2, delete the following three United States references:

"5,547,614 A    8/1996     Fesman et al.
6,136,997 A    10/2000    Bright et al.
2002/0049268 A1    4/2002    White et al."

Title Page Item (56) References Cited, FOREIGN PATENT DOCUMENTS, pages 1 and 2, delete the following three foreign references:

"EP  0406934    1/1991
EP  0612837    8/1994
WO 96/11996    4/1996"

Signed and Sealed this

Seventeenth Day of August, 2010

David J. Kappos
*Director of the United States Patent and Trademark Office*